US011104510B2

(12) United States Patent
O'Neill

(10) Patent No.: US 11,104,510 B2
(45) Date of Patent: Aug. 31, 2021

(54) LIGHTWEIGHT TRANSPORT, STORAGE, AND DELIVERY SYSTEM

(71) Applicant: Kevin M. O'Neill, Plano, TX (US)

(72) Inventor: Kevin M. O'Neill, Plano, TX (US)

( * ) Notice: Subject to any disclaimer, the term of this patent is extended or adjusted under 35 U.S.C. 154(b) by 0 days.

(21) Appl. No.: 16/696,551

(22) Filed: Nov. 26, 2019

(65) Prior Publication Data

US 2020/0095058 A1 Mar. 26, 2020

Related U.S. Application Data

(63) Continuation-in-part of application No. 16/280,782, filed on Feb. 20, 2019, now Pat. No. 10,486,579.

(60) Provisional application No. 62/633,057, filed on Feb. 20, 2018.

(51) Int. Cl.
| | |
|---|---|
| *B65D 88/56* | (2006.01) |
| *B65D 88/26* | (2006.01) |
| *B65D 77/06* | (2006.01) |
| *B66F 9/16* | (2006.01) |

(52) U.S. Cl.
CPC .......... *B65D 88/56* (2013.01); *B65D 77/061* (2013.01); *B65D 88/26* (2013.01); *B65D 2588/165* (2013.01); *B66F 9/16* (2013.01)

(58) Field of Classification Search
CPC ............... B60P 1/6472; B65D 88/1606; B65D 88/1618; B65D 88/1668; B65D 88/1675
See application file for complete search history.

(56) References Cited

U.S. PATENT DOCUMENTS

| | | | | |
|---|---|---|---|---|
| 3,893,595 | A | * | 7/1975 | Khanna .............. B65D 88/1681 222/181.3 |
| 4,232,803 | A | | 11/1980 | Muller et al. |
| 4,499,599 | A | | 2/1985 | Polett et al. |
| 5,333,757 | A | | 8/1994 | Volk et al. |
| 5,344,048 | A | * | 9/1994 | Bonerb ............... B65B 69/0075 222/105 |
| 5,415,323 | A | | 5/1995 | Fenelon |
| 5,558,485 | A | | 9/1996 | Haynes |
| 5,713,510 | A | * | 2/1998 | Walton ................... B65D 25/22 220/754 |
| 6,079,934 | A | | 6/2000 | Beale |
| 6,318,594 | B1 | * | 11/2001 | Hutchins ............. B65B 69/0091 222/1 |
| 6,431,753 | B1 | * | 8/2002 | Rogers ............... B65D 88/1668 383/24 |

(Continued)

OTHER PUBLICATIONS

"International Search Report and Written Opinion, PCT/US2019/018799", dated Jun. 3, 2019.

*Primary Examiner* — Kaitlin S Joerger
(74) *Attorney, Agent, or Firm* — Law Office of Mark Brown, LLC; Christopher M. DeBacker

(57) ABSTRACT

Reusable, flexible, lightweight, low cost flexible intermediate bulk containers (FIBCs) for the delivery of granular proppant material for fracing that will allow the transport of higher weights of proppant, such as sand, per truck load. The invention includes a container made of a high strength, flexible material with a top opening for loading and deploying the proppant. The container can be lifted and deployed with a fork truck or crane. Alternatively, proprietary deployment systems, such as a conveyor system, can be used to quickly and efficiently deploy the proppant from the container at a desired site.

5 Claims, 29 Drawing Sheets

(56) References Cited

U.S. PATENT DOCUMENTS

| | | | |
|---|---|---|---|
| 7,018,098 B2* | 3/2006 | Richardson, Jr. | B65D 88/1618 |
| | | | 220/495.03 |
| 7,476,028 B2 | 1/2009 | Richardson, Jr. et al. | |
| 7,837,427 B2 | 11/2010 | Beckel et al. | |
| 7,958,995 B2* | 6/2011 | Dedmon | B65D 77/061 |
| | | | 206/386 |
| 9,248,772 B2 | 2/2016 | Oren | |
| 9,340,353 B2 | 5/2016 | Oren et al. | |
| 9,358,916 B2 | 7/2016 | Oren | |
| 9,421,899 B2 | 8/2016 | Oren | |
| 9,670,752 B2 | 6/2017 | Glynn et al. | |
| 9,751,691 B2* | 9/2017 | Hunter | D05B 13/00 |
| 9,932,181 B2 | 4/2018 | Oren | |
| 10,259,646 B2* | 4/2019 | Park | B65D 88/1631 |
| 2004/0190799 A1* | 9/2004 | Hess | B65D 88/1618 |
| | | | 383/66 |
| 2008/0008562 A1 | 1/2008 | Beckel et al. | |
| 2010/0155066 A1 | 6/2010 | Fordyce | |
| 2012/0193354 A1* | 8/2012 | Cavenagh | B65F 1/1415 |
| | | | 220/9.3 |
| 2013/0022441 A1 | 1/2013 | Uhryn et al. | |
| 2014/0086512 A1 | 3/2014 | Brown et al. | |
| 2014/0151049 A1 | 6/2014 | Sanborn et al. | |
| 2014/0212070 A1* | 7/2014 | Diao | B65D 88/1681 |
| | | | 383/24 |
| 2015/0266668 A1* | 9/2015 | Dogan | B65D 88/165 |
| | | | 383/117 |
| 2015/0284194 A1 | 10/2015 | Oren et al. | |
| 2016/0009489 A1 | 1/2016 | Lofton et al. | |
| 2016/0207699 A1 | 7/2016 | Oren et al. | |
| 2017/0166394 A1* | 6/2017 | Baylay | B65D 90/022 |
| 2017/0225883 A1 | 8/2017 | Oren | |
| 2017/0253425 A1* | 9/2017 | McKee | B65D 88/54 |
| 2017/0320684 A1 | 11/2017 | Oren et al. | |
| 2018/0148269 A1 | 5/2018 | Oren et al. | |
| 2018/0194549 A1* | 7/2018 | Chartrel | B65D 88/165 |

* cited by examiner

LIGHTWEIGHT TRANSPORT, STORAGE, AND DELIVERY SYSTEM

CROSS-REFERENCE TO RELATED APPLICATION

This application is a continuation-in-part of and claims priority in U.S. patent application Ser. No. 16/280,782 filed Feb. 20, 2019, which claims priority in U.S. Provisional Patent Application No. 62/633,057 filed Feb. 20, 2018, and also claims priority in U.S. Provisional Patent Application 62/811,184, filed Feb. 27, 2019, all of which are incorporated herein by reference.

BACKGROUND OF THE INVENTION

1. Field of the Invention

The present invention relates generally to a transportation system for dry bulk or granular substances such as proppant or sand and method for use thereof, and more specifically to a lightweight, flexible, inexpensive material container for the purpose of storage and/or transport of bulk material or storage and transporting sand and/or proppant to fracing sites.

Additionally, this invention relates to large, box-shaped, cargo bags, typically one cubic yard or larger in capacity, of the type which are used for handling and transporting commercial quantities of dry bulk cargo. Dry bulk cargo refers to dry, or low moisture, powdered, granular or pelletized products such as grains, fertilizers, chemicals, etc. which are substantially free-flowing, when in bulk form. Very large quantities of free-flowing dry bulk cargo, such as grains, fertilizers and chemicals, typically are transported by means of tankers, barges, hopper cars, etc. However, intermediate quantities of such chemicals, from a few cubic feet to a few cubic yards, typically are handled as bagged or boxed cargo. One type of heavy-duty bag for handling such intermediate quantities of dry bulk cargo which has become increasingly popular in recent years is six sided (four sides plus a top and bottom), generally rectilinear, and formed of a heavy woven fabric, which can be a man-made fiber, but more typically is a polymer, such as woven polypropylene fiber. Such bags typically hold about one or more cubic yards of dry bulk cargo and can be handled by readily available equipment such as forklifts and transported in conventional trucks or cargo containers

2. Description of the Related Art

In the process of acquiring oil and/or gas from a well, it is often necessary to stimulate the flow of hydrocarbons via hydraulic fracturing ("fracing"). The term "fracturing" refers to the method of pumping a fluid into a well until the pressure increases to a level that is sufficient to fracture the subterranean geological formations containing the entrapped materials. This process results in cracks and breaks that disrupt the underlying layer to allow the hydrocarbon product to be carried to the well bore at a significantly higher rate. Unless the pressure is maintained, however, the newly formed openings close. In order to open a path and maintain it, a propping agent or "proppant" is injected along with the hydraulic fluid to create the support needed to preserve the opening. As the fissure is formed, the proppants are delivered in a slurry where, upon release of the hydraulic pressure, the proppants form a pack or a prop that serves to hold open the fractures.

Typically, in any hydraulic fracturing operation, a large amount of such proppant is required. Historically, it has been difficult to effectively store the proppant at the fracturing sites. Additionally, it has been found to be rather difficult to effectively transport the proppant to the desired location. Often, proppant is hauled to the desired locations in pneumatic tankers, box type containers or on the back of trucks and is dumped on site. If dumped on site, the proppant is often exposed to adverse weather conditions. This will effectively degrade the quality of the proppant during its storage. The storage of proppant on site or at the storage facilities require costly storage containers or boxes requiring a large capital investment in the storage containers. The unloading of such storage facilities is carried out on a facility-by-facility basis. As such, there is a need to be able to effectively transport the proppant to and store the proppant in a desired location adjacent to the hydraulic fracturing location.

Existing and commonly used systems for transporting and delivering proppant to well sites are all made of steel and are inherently heavy in weight and the weight of the containers lessons the amount of sand that can be hauled with in the 80,000 lb highway limit. These current methods of container delivery are also relatively costly. A lighter weight system such as the present invention could allow for up to 20% more sand to be hauled per truck. Up until now the proppant storage and deliver containers in use have also proved too costly to be used for inter modal transport and or longer term storage. The mine to well proposition of the legacy steel box systems has not been realized due to the steel containers relatively high cost. In addition the present legacy containers, due to their height and higher center of gravity, typically require expensive drop deck type of trailers rather than the less expensive and more available flatbed trailers. In addition the present systems need to be weighed to determine their load. The present systems sometimes come back from the well with sand still contained in them because the operator of the fork truck cannot readily determine whether they are empty.

Further increasing expensive, if a truck delivers sand to a site and cannot immediately unload, then the operator is charged demurrage for waiting. It is common at many frac sites for a number of trucks to be waiting in line to be unloaded, for which the operator is being charged demurrage. It is important that as soon as the sand is delivered to the frac site, that it can be immediately unloaded to eliminate a demurrage charge Further complicating the entire process, the type of sand used in fracing is also very critical. The sand should have high quartz content so that it will not crush in the cracks of the formation, but will hold the cracks open. The deeper the well, normally the more quartz content that is required. In order to get the appropriate types of sand, fracing companies have to purchase it throughout the world. For example, in deep wells in South Texas, the good quality fracing sand comes from such places as the States of Wisconsin and Illinois or countries such as China. From other countries, the sand is delivered to the United States by ship and is handled at multiple locations in multiple ways with very inefficient supply chain logistics for the handling of the fracing sand. The more times the fracing sand is handled, the more expensive it is to the individual fracing company and to the well operator. This is passed along to the consumer in the increased price of gasoline Traditionally, FIBCs had to be transported with lifting straps that were attached to the forks of a fork truck above the top of the container or pallets that were cumbersome and inefficient. Traditional Lifting straps required the fork operator or someone to attach the straps to his forks and then have a spotter watch so that he does not endanger anyone when moving the container. Pallets add an additional cost and weight and are limited by the amount of weight they can hold.

Existing FIBCs have a chute that opens on the bottom of the container for emptying the FIBC. This limited the amount of weight a FIBC could hold as the bottom chute was prone to failure because of the weight. This bottom chute also increased the risk to the user as the operator would need to open the bottom cute and risked being crushed by its contents.

FIBCs up to now have not had strengthening straps that run horizontally around the sides of the container. And are there for subject to puncture in that area not covered with a strengthening strap and are subject to more bulging of the sides of the container in those areas when the container is filled.

FIBCs up to now did not have lifting straps that ran over the top side of the container and heavy materials can not readily be held in the upside-down position with failure of the container.

FIBCs up to now that carried heavy weights had to be ruptured or punctured to unload their contents resulting in the container a use once and throw away system which is more costly.

Up until now many bulk transport systems do not provide a sealed containment system that limits the contamination of the contents of the system when discharging.

Up until now the current proppant steel box systems the user many times does not know if the container is completely discharged.

Up until now the steel box systems used to transport frac sand are heavy and range in weight 7,000 lbs. each for a two box per truck system to 12,000 lbs. for a single box per truck system.

Heretofore there has not been available a system or method for bulk material or proppant storage, transport, and/or delivery with the advantages and features of the present invention.

BRIEF SUMMARY OF THE INVENTION

The present invention generally provides reusable, flexible, lightweight, low cost flexible intermediate bulk containers (FIBCs) for the delivery of granular material for fracing that will allow the transport of higher weights of sand per truck load. It is another object of the present invention to provide a delivery system that can facilitate the unloading of sand in to many of the present systems currently in use. It is still another object of the present invention to provide a low cost storage system for the inter-modal or distributed storage locations. It is another object of the present invention to provide low cost reusable containers that can carry sand all the way from the quarry to the ultimate destination of a fracing site without repeated handling of the sand. It is another object of the present invention to efficiently and safely transfer and discharge an FIBC with a single fork truck or lifting and moving mechanism, without the need for peripheral equipment. It is another object of the present invention to efficiently move and handle FIBCs using automated equipment.

The bag would consist of a nylon or other high strength fabric with or without a flexible HDPE (High Density Polyethylene) outer layer container which may have dimensions of approximately 6 ft.x6 ft.x6 ft, although size can vary, and in the case of a frac container, has a strengthening straps with a water proof inner liner therein to carry fracing sand. Alternatively, a lightweight, rigid plastic or lightweight container with or without strengthening members, and optionally including a zipper top or plastic zipper cover, or combination of a strong zipper cover with a weaker cover or fastener that opens on its own when the weight of the contents puts force against it as when the container is tilted for emptying, may be provided in the top of the container and optionally include support members that keep the flexible sides of the container upright when filling. These could be shipped with or without the use of pallets.

The low-cost container may be taken directly to the bulk material loading site or to the quarry and loaded with bulk material or sand. The low-cost container can then move through all of the normal modes of transportation including ship, barge, rail or by truck, all the way to the frac site or to where it is needed. The bulk material or sand never has to be handled again. All that has to occur is the low-cost container is moved from one mode of transportation to another (i.e., ship-to-rail-to-truck) as it moves from its origin to its final user or from quarry to the frac site.

These containers have the advantage of being stackable using any conventional means, either prior to transit or after being unloaded at the frac site. This eliminates the demurrage of waiting to unload sand into bulk sand containers at the site. When unloaded, they can be lifted or the side of the container felt by a worker to determine that it is empty.

The container may include a spout or a spout attachment, and the spout would include a water tight seal with the discharge container. A water tight loading hatch is also included for the loading of sand or proppant into the container. A preferred embodiment would be sized for lifting using smaller fork lifts or cranes for movement about a site or for loading onto a transport truck. An embodiment would be suitable to have four 13,000 lb or more containers of proppant be possible to be loaded onto a single trailer.

An embodiment may also include a loading mechanism with or without extra side supports to support heavier loads for turning the containers up to 180 degrees such that the proppant can exit the container by gravity when discharging from the top side of the container.

An embodiment of the invention may be capable of loading proppant from FIBCs into legacy pneumatic or box frac sand well site delivery systems.

A container marking system may be included which allows the containers to be loaded by volume. This allows the loader to look and/or feel by touching the container to determine if it has been filled to the desired level or emptied to a desired level. The numbers could indicate by sand weight by volume (e.g. 2, 4, 6, 8, 10, 12, and 13) in thousands of pounds or kilos determined by the density of the material. Gravel would have different number scale because in has a different density. An FBIC could have multiple different scales printed op it's sides for different materials.

A loading system may be included which raises and tilts the containers to an angle such that they can be emptied by gravity.

A device may be included which allows the containers to be loaded at a loading facility using a conveyor belt while the container is preferably held upright for loading.

An object of the present invention is the ability for a fork truck to easily engage and lift the FIBC without assistance and to transport the FIBC at a low height, similar to is if it was carried on a pallet. This can be done without the need for a pallet. An additional object of the present invention is the ability to discharge an FIBC by rotating it to a downward position using the fork truck such that it unloads by gravity from its top.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Proppant Container System 2

Figure 1:
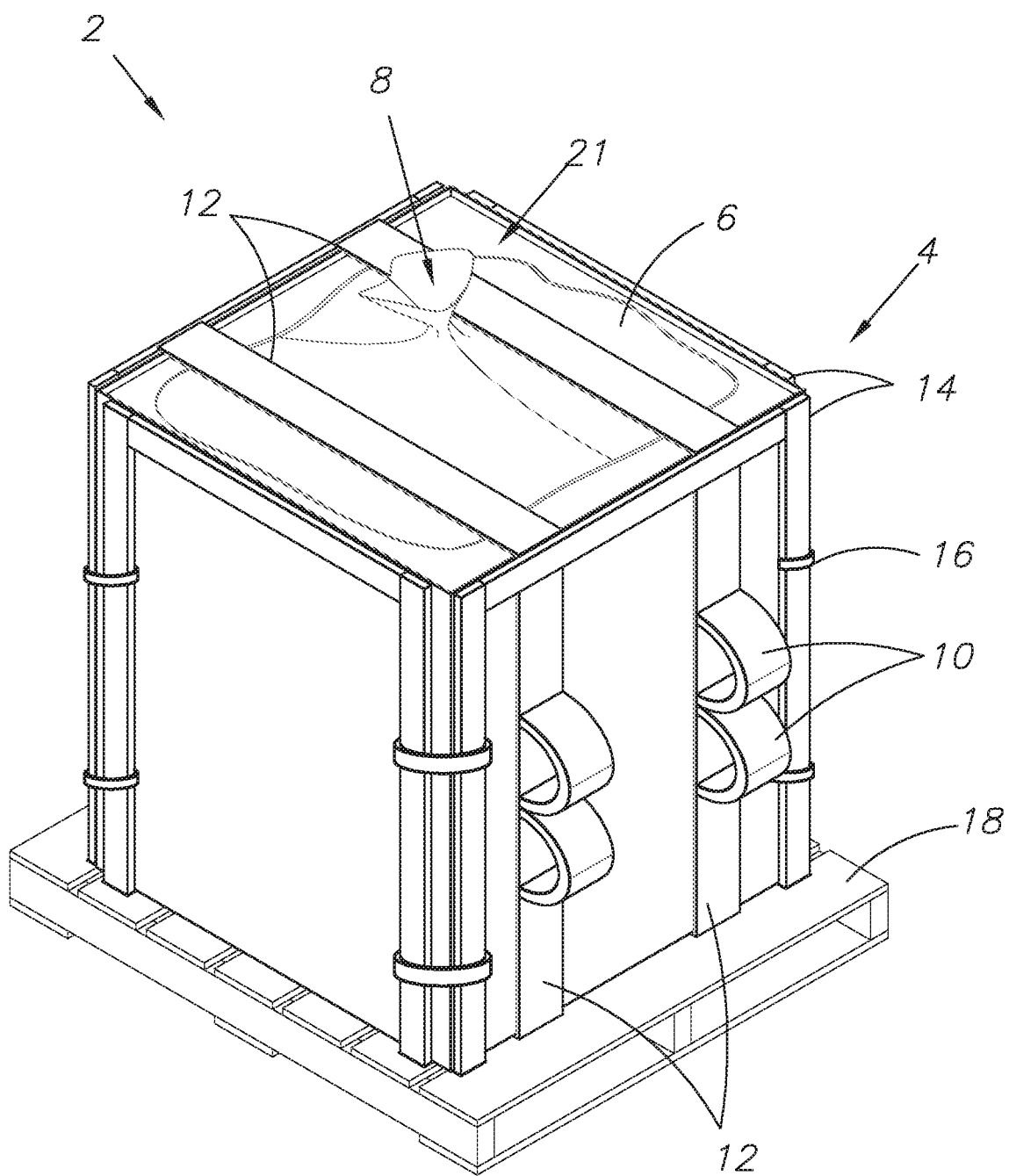
FIG. 1 is a three-dimensional isometric view of a first embodiment of the present invention.
Figure 2:
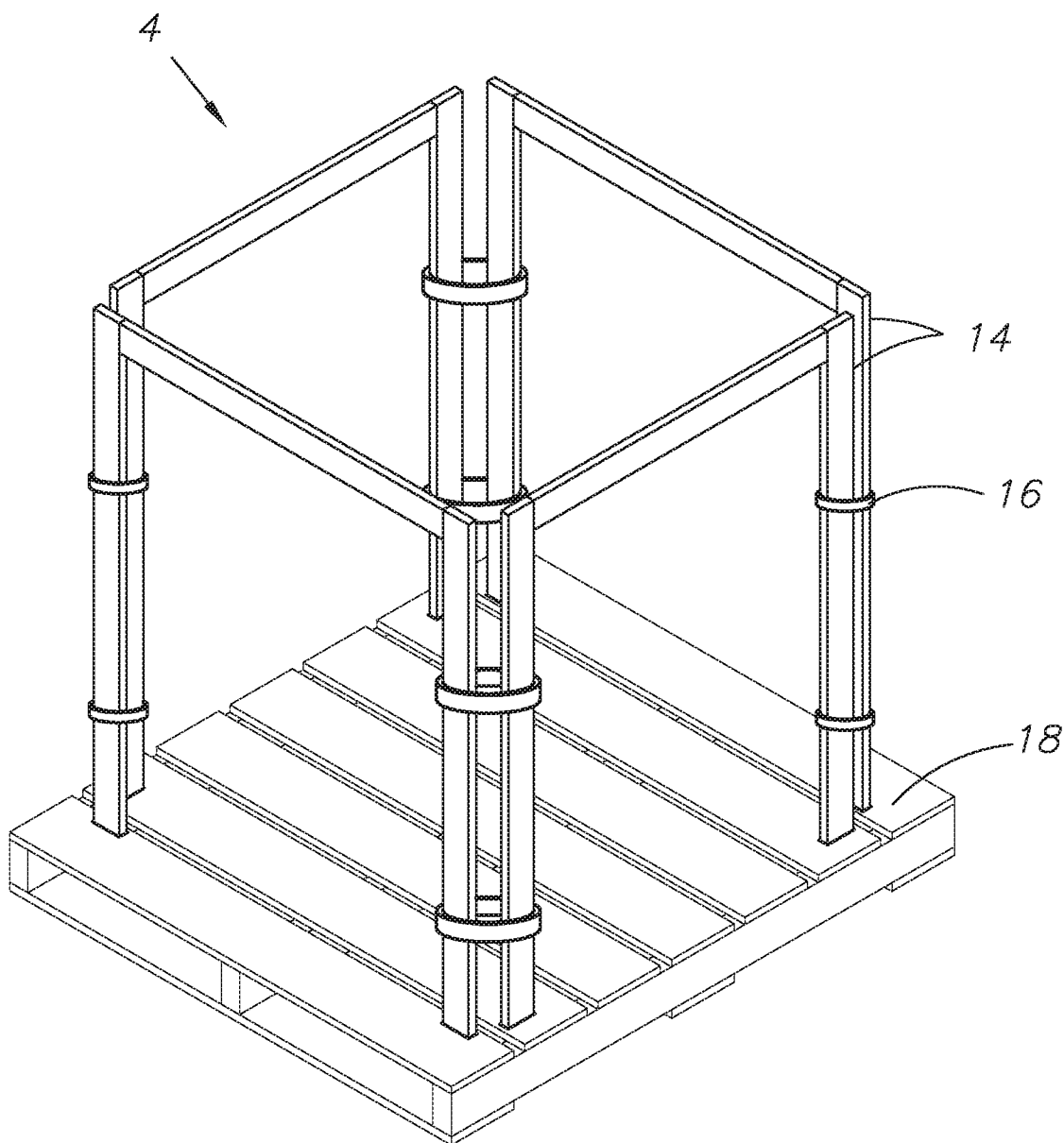
FIG. 2 is a three-dimensional isometric view of frame elements thereof.

FIG. 1 shows a preferred embodiment proppant container system 2 for containing proppant for fraccing purposes, such as sand. The embodiment consists of a reusable, flexible, lightweight, low cost flexible intermediate bulk container (FIBC) 6 which stores the proppant. The proppant is inserted into the container via an opening 8, which is then secured using a tie or other suitable closure. The FIBC material could be heavy weight high strength nylon fabric or other suitable materials.

A rigid frame 4 is shown about the container 6 to secure it for transport and to prevent damage to the container. The frame consists of side frame members 14 which enclose the container 6. The container 6 is accessible via a top opening 21 of the frame 4. Straps 16 connect the side frame members 14 together.

Lifting loops 10 designed for receiving connections from a crane or forklift are secured to the frame 4. These loops 10 are connected to the frame 4 via lifting straps 12 which can wrap around underneath the container 6 and constrains the container 6 about the top end which prevents the container 6 from exiting the frame 4 when the frame is tilted to empty the container.

Figure 3:
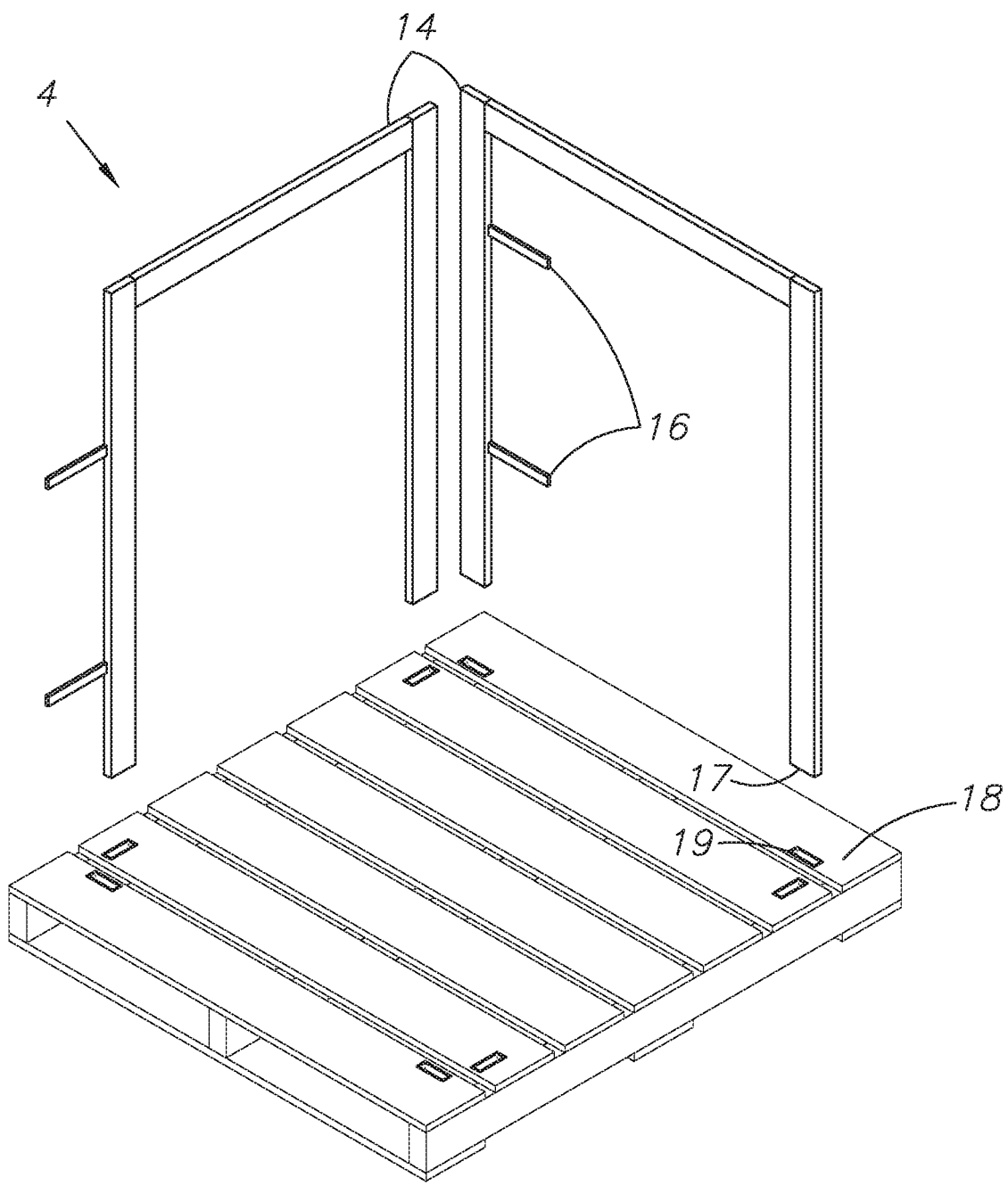
FIG. 3 is another three-dimensional isometric view of frame elements thereof.

FIG. 3 shows that the pallet 18 may have slots 19 for receiving the bottom ends 17 of the frame elements 14 to further secure the entire assembly together.

III. Alternative Embodiment Proppant Container System 52

Figure 4:
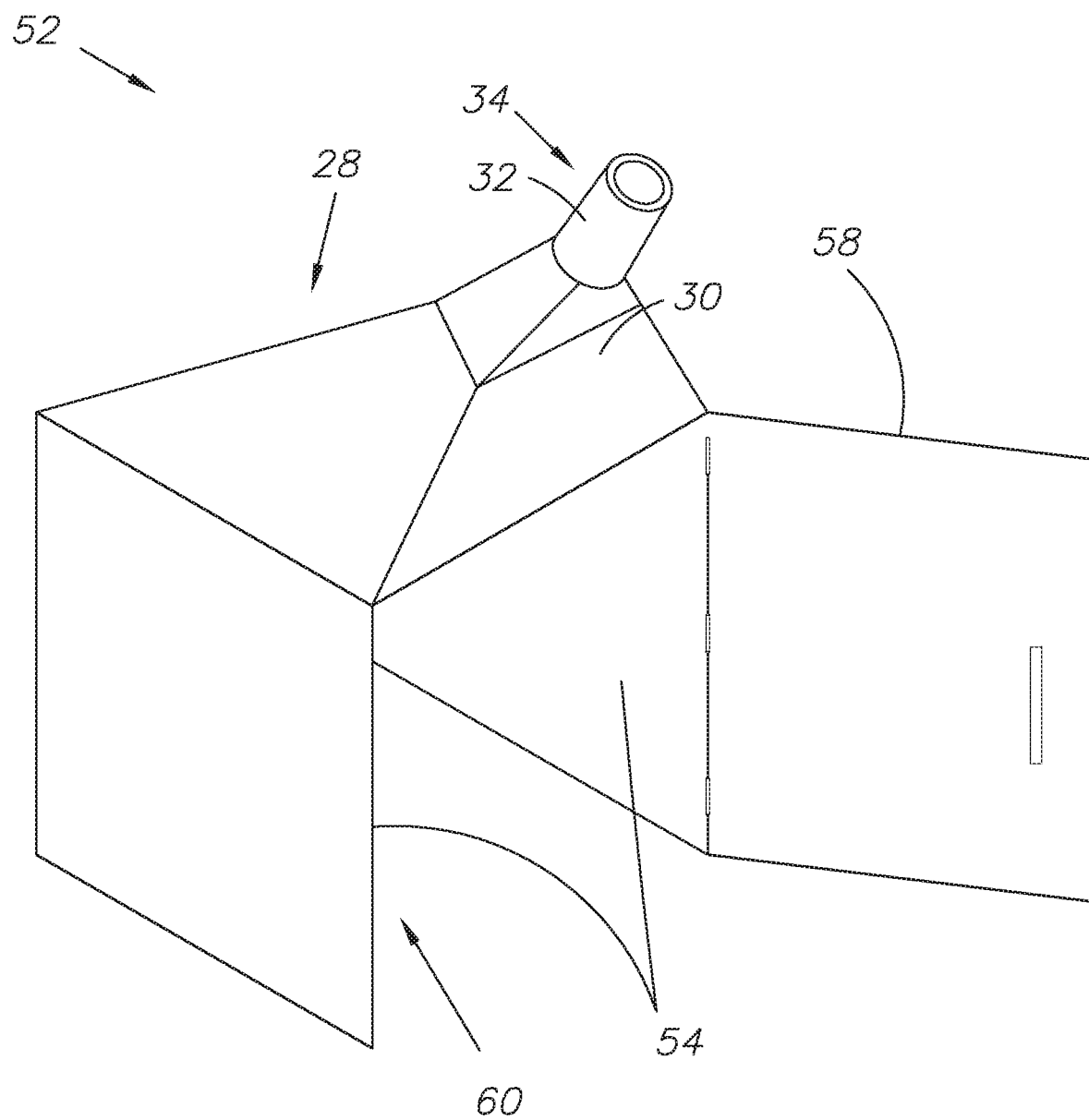
FIG. 4 is a three-dimensional isometric view of another alternative embodiment of the present invention.

FIG. 4 shows an alternative embodiment proppant container system 52 which has an external housing consisting of four three side walls 54 and a door 58 which define an interior space 60 for storing the proppant, either loose or in an FIBC as described above. The funnel assembly 28 can be deployed on top of the three side walls 54 and door 58. The spout 32 is located on the same side of the container system 52 as the door 58, and extends out over the door.

Figure 5:
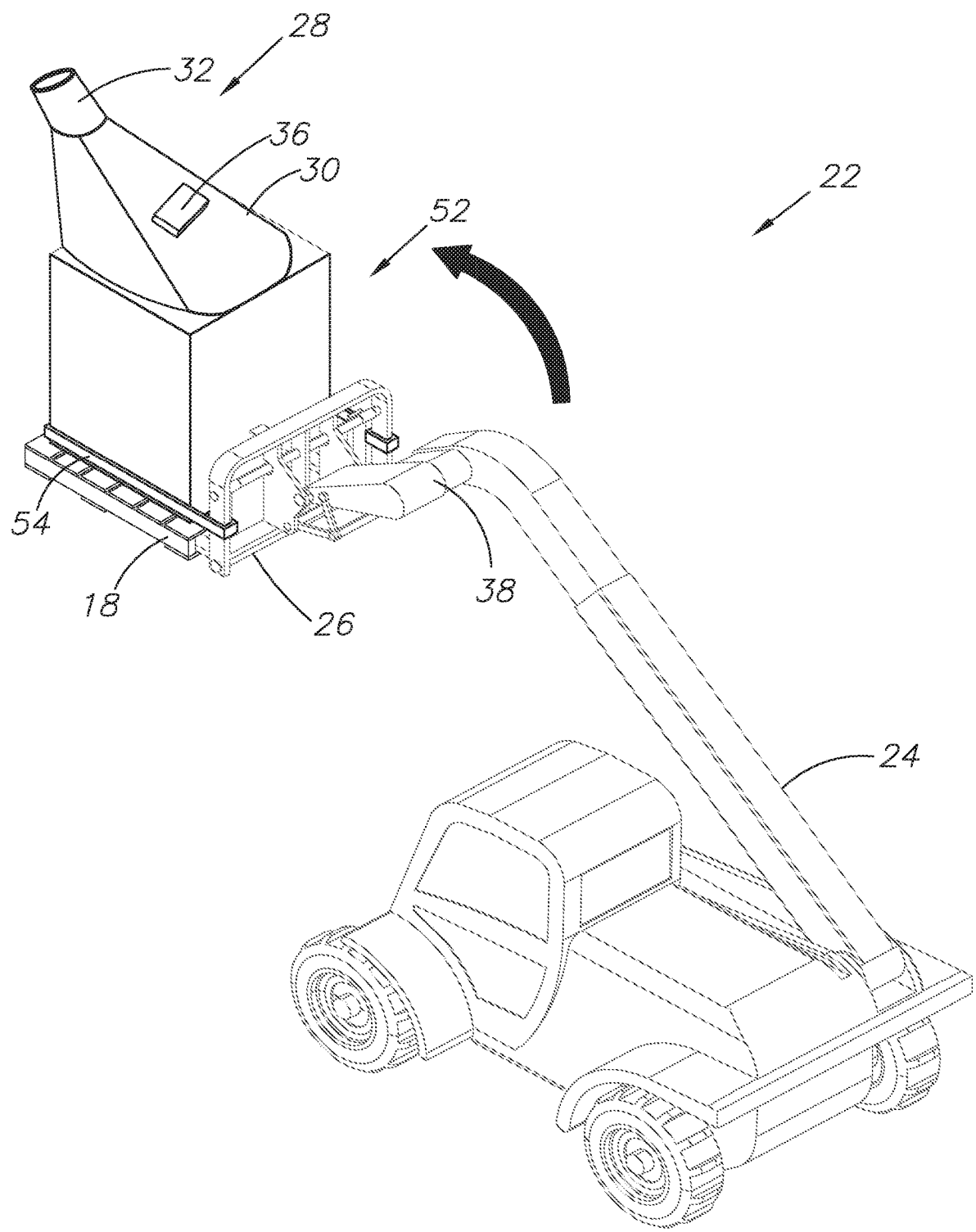
FIG. 5 is a three-dimensional isometric view thereof shown in a raised orientation with a fork truck.

FIG. 5 shows the proppant container system 52 used in an unloading configuration 22 where the system 52 is lifted by a fork truck 24 having a pivotable arm assembly 38. A funnel assembly 28 is connected to the top opening of the proppant container system 52. This allows the container 6 to be safely and efficiently unloaded via the spout 32 opening 34 of the funnel assembly 28. A vacuum pump 36 within the funnel assembly 28 allows for the removal of dust within the assembly. A strap 54 secures the container system 52 to the carriage 26 of the fork truck 24.

Figure 6:
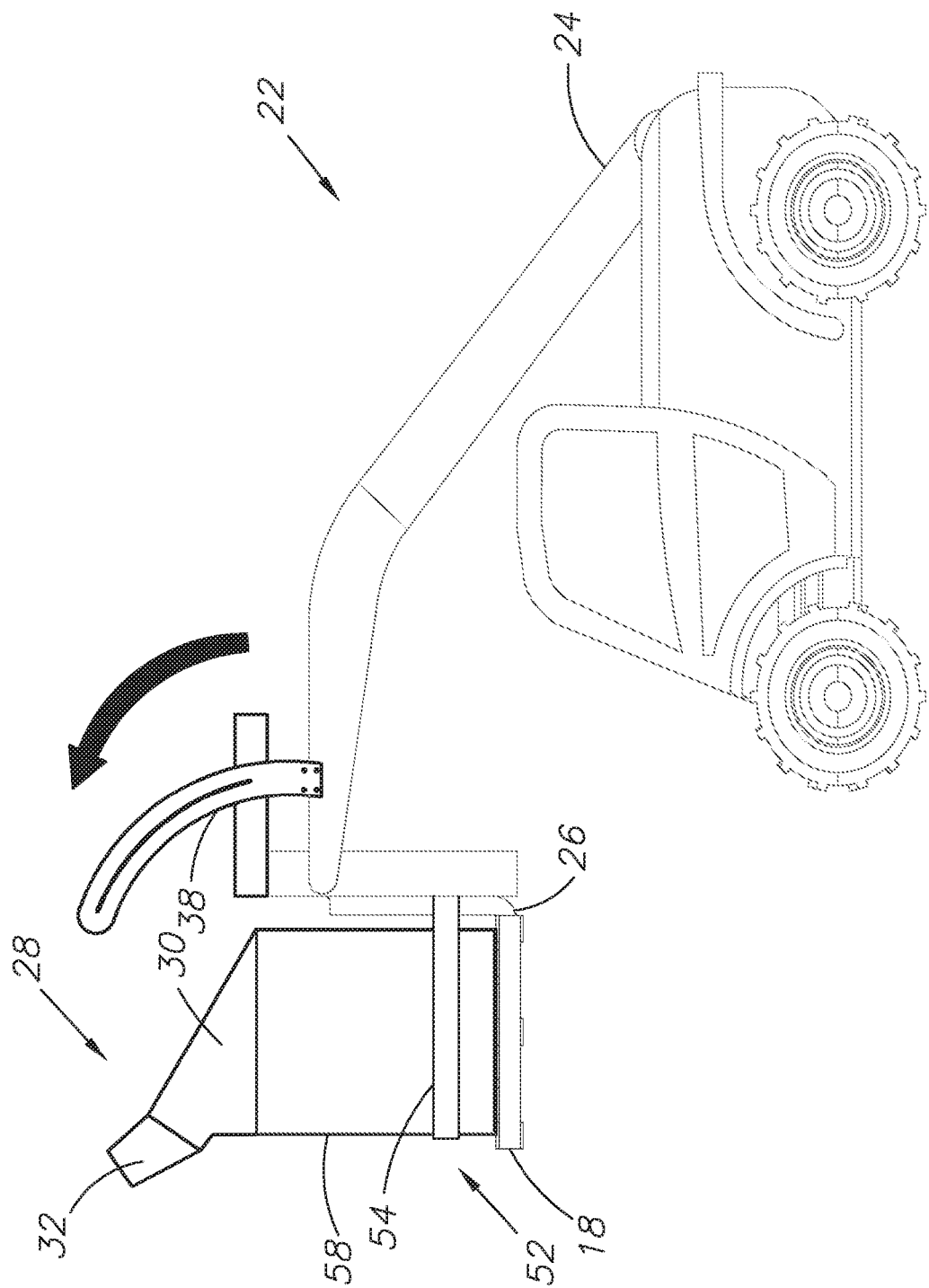
FIG. 6 is a side elevational view thereof.

As shown in FIGS. 5 and 6, the container system 2 is lifted by inserting the carriage 26 of the fork truck 24 through the pallet 18.

Figure 7:
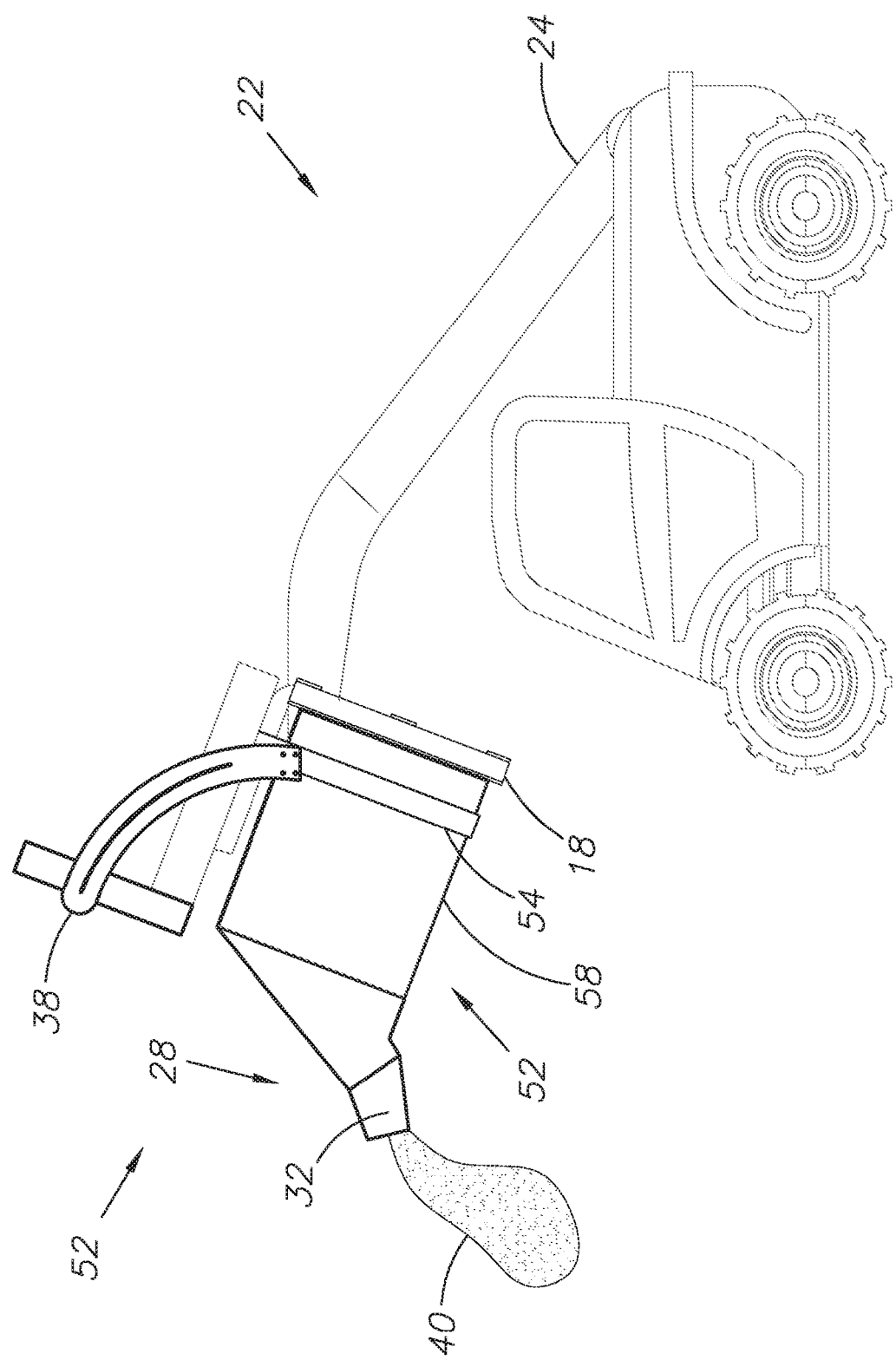
FIG. 7 is a side elevational view thereof shown in an unloading orientation.

FIG. 7 shows how the entire container assembly 2 can be tipped down by the pivotable arm assembly 38 to empty the proppant 40 from the funnel assembly 28. The assembly can tilt up to 180 degrees preferably.

IV. Alternative Embodiment Proppant Container System 102

Figure 8:
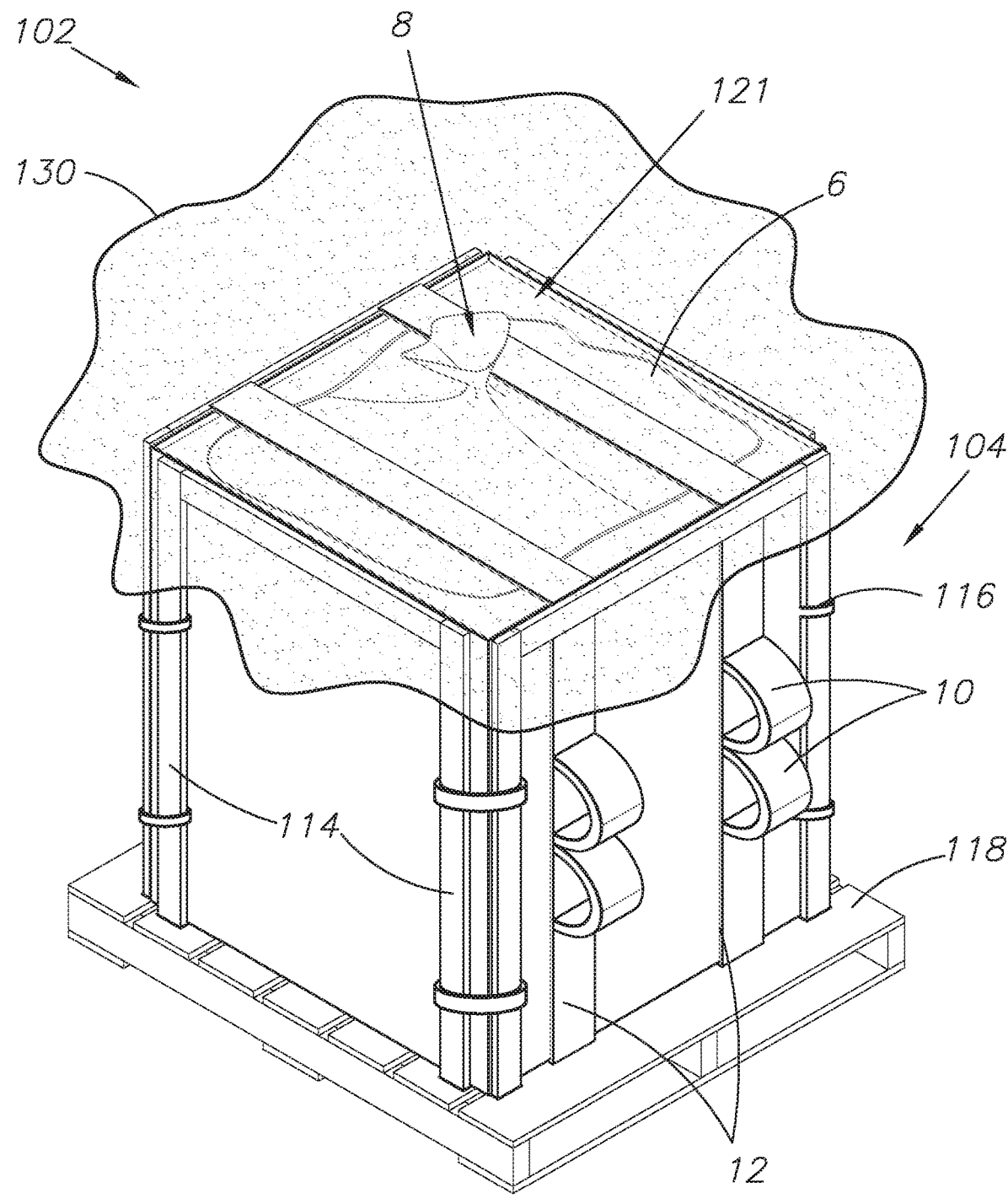
FIG. 8 is a three-dimensional isometric view of yet another alternative embodiment of the present invention including a covering.
Figure 9:
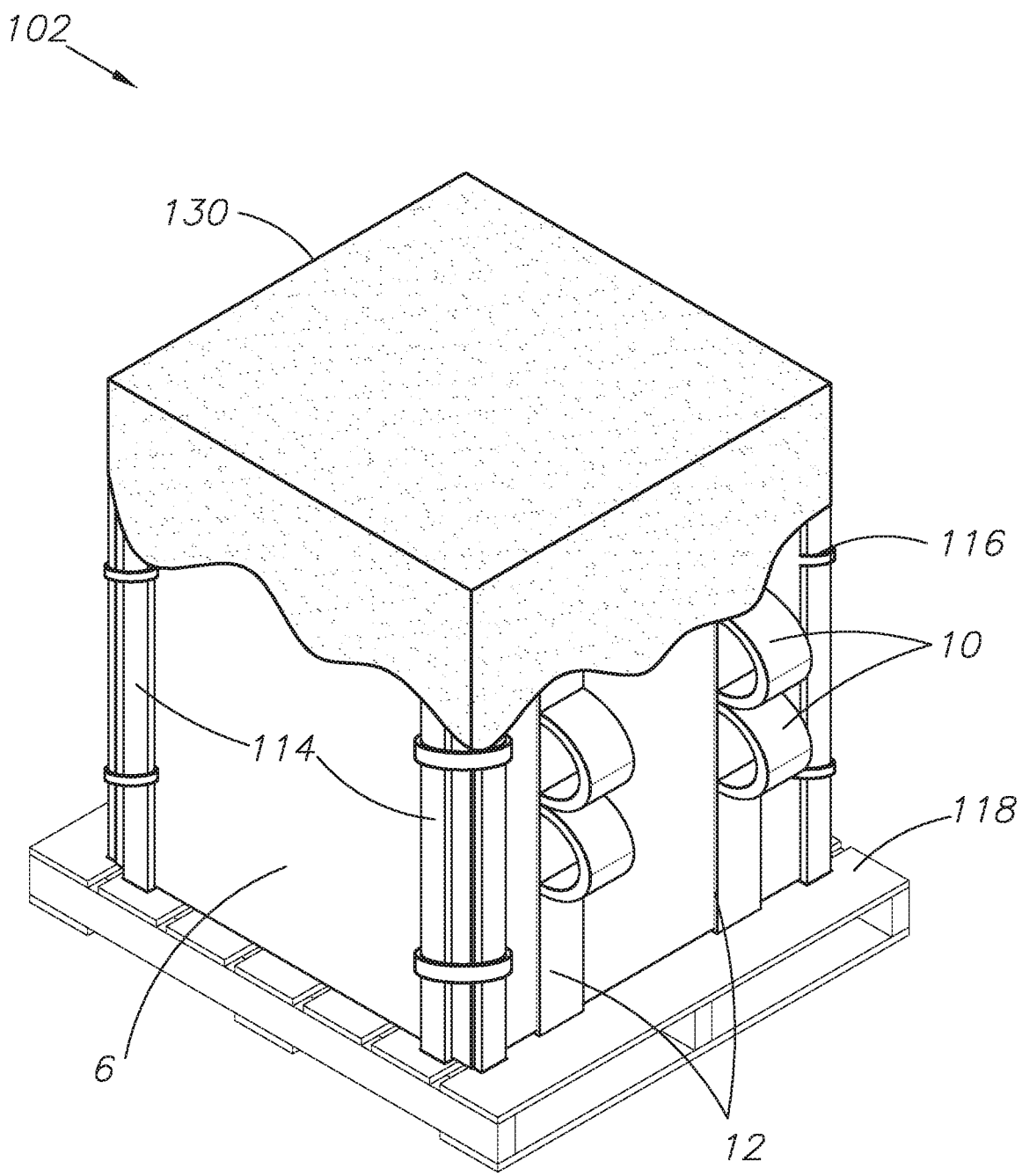
FIG. 9 is another three-dimensional isometric view thereof shown in a covered orientation.

FIGS. 8 and 9 show another alternative embodiment proppant container system 102 which contains a similar enclosure to the first embodiment described above. However, these show a frame 104 which does not insert into the pallet 118. Otherwise, the frame and container 6 could be identical to that embodiment.

As before, the rigid frame 104 is built about the container 6 to secure it for transport and to prevent damage to the container. The frame consists of side frame members 114 which enclose the container 6. The container 6 is accessible via a top opening 121 of the frame 104. Straps 116 connect the side frame members 114 together. The same lifting loops 10 and straps 12 can be used in this embodiment.

A cover 130 can be secured about the top opening 121 of the frame 104. This cover 130 would protect the container 6 within the frame 114. It could be secured to the frame 104 using tie downs, clasps, a large elastic band, or other suitable devices.

V. Alternative Embodiment Proppant Container System 152

Figure 10:
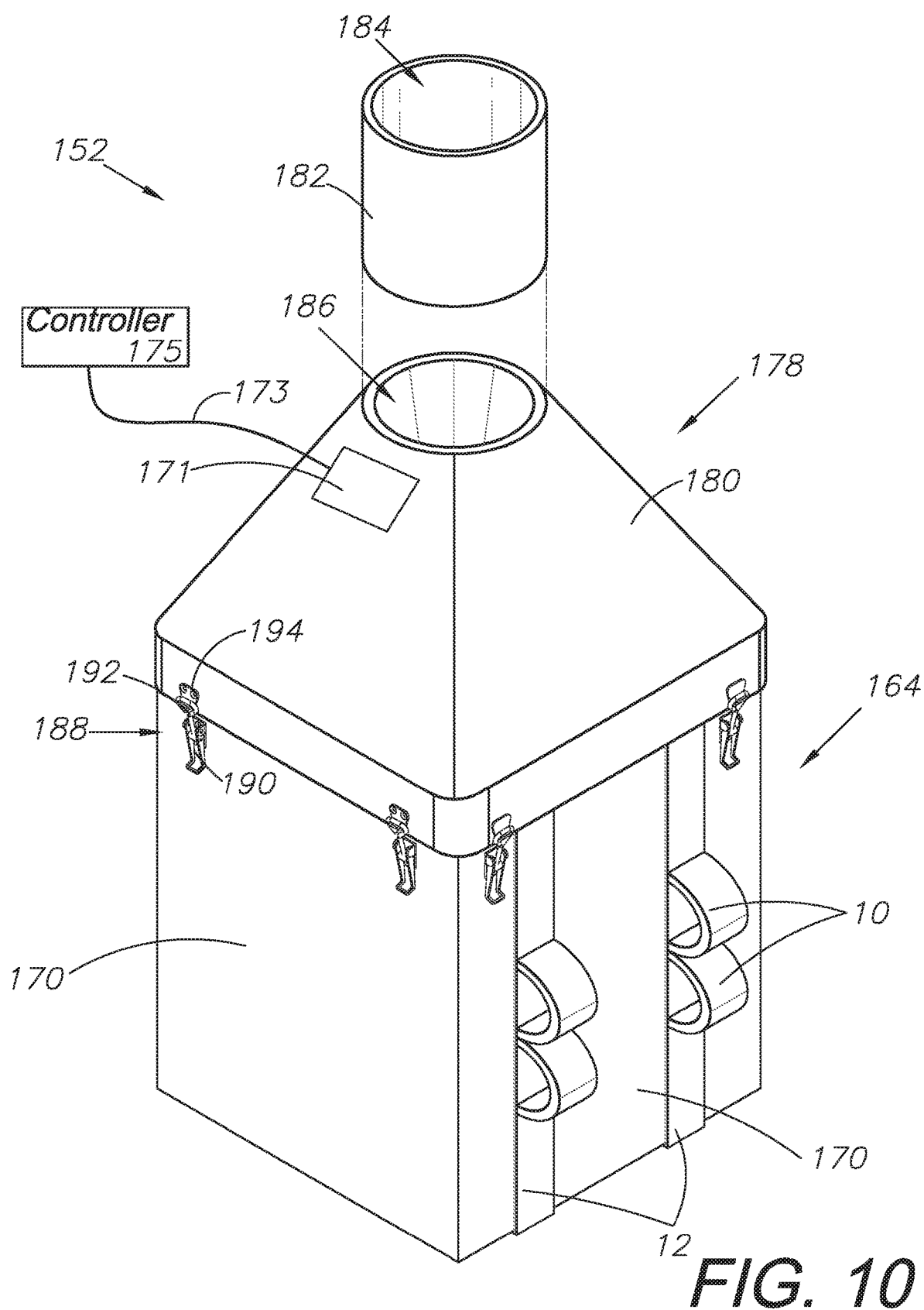
FIG. 10 is a three-dimensional isometric view of yet another alternative embodiment of the present invention.

FIG. 10 shows another alternative embodiment proppant container system 152 which has a frame 164 formed from four side walls 170 and a floor 172. A funnel system 178 with a spout 182 can be connected to the top of the container 164 using clips 188 with claps 190 located on the walls 170 of the container 164 having hooks 192 for connecting into receivers 194 on the wall 180 of the funnel system 178. The spout 182 includes an opening 184 for discharging bulk material or proppant from the container 164 through the funnel assembly 178. The spout may be selectively removable and adjustable about an opening 186 on the wall 180 of the funnel system 178. A gate valve 171 can be used to open and shut the spout 182 as desired. A controller 175 is connected via control wire or hose 173 to the gate valve 171 and may be remotely connected to the gate valve. Lifting straps 12 with lifting loops 10 as discussed above may or may not be used.

VI. Alternative Embodiment Proppant Container System 202

Figure 11:
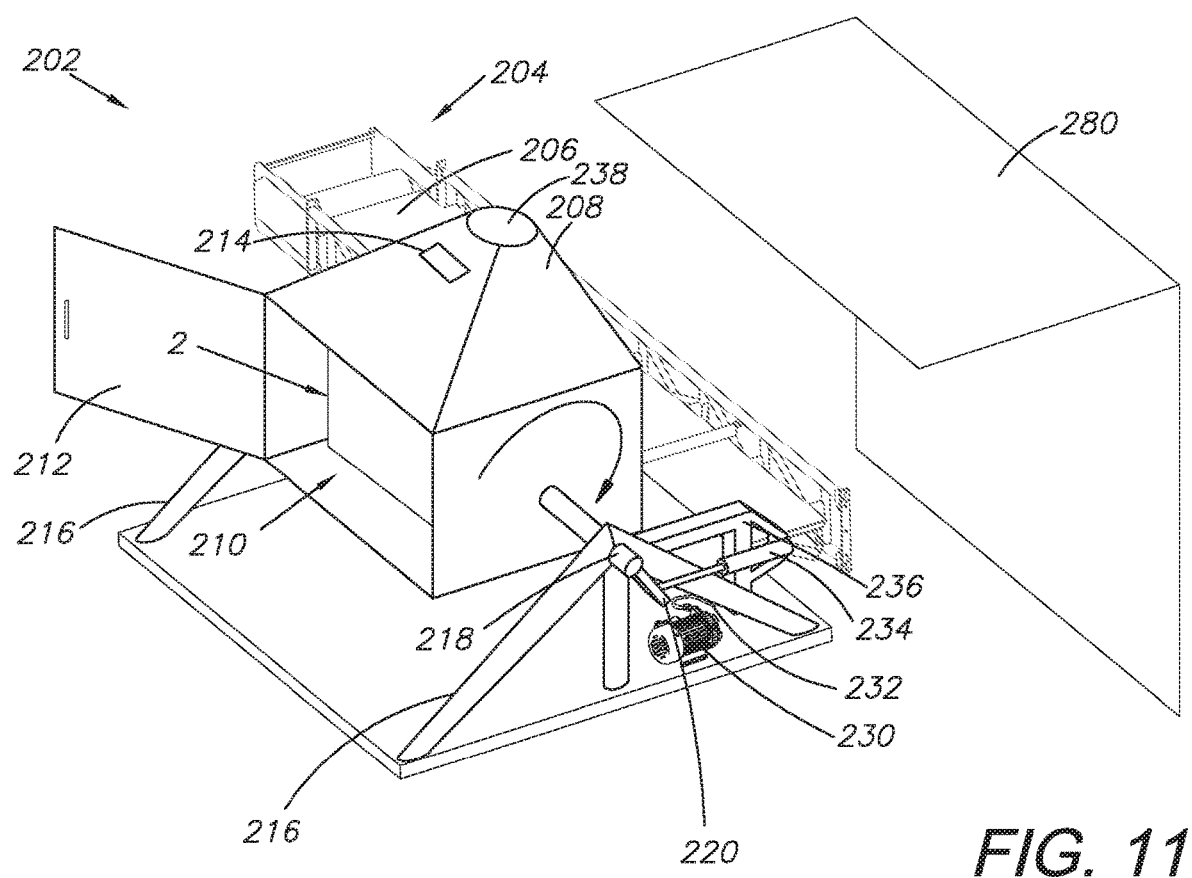
FIG. 11 is a three-dimensional isometric view of a conveyor unloading system which forms another embodiment of the present invention.
Figure 11A:
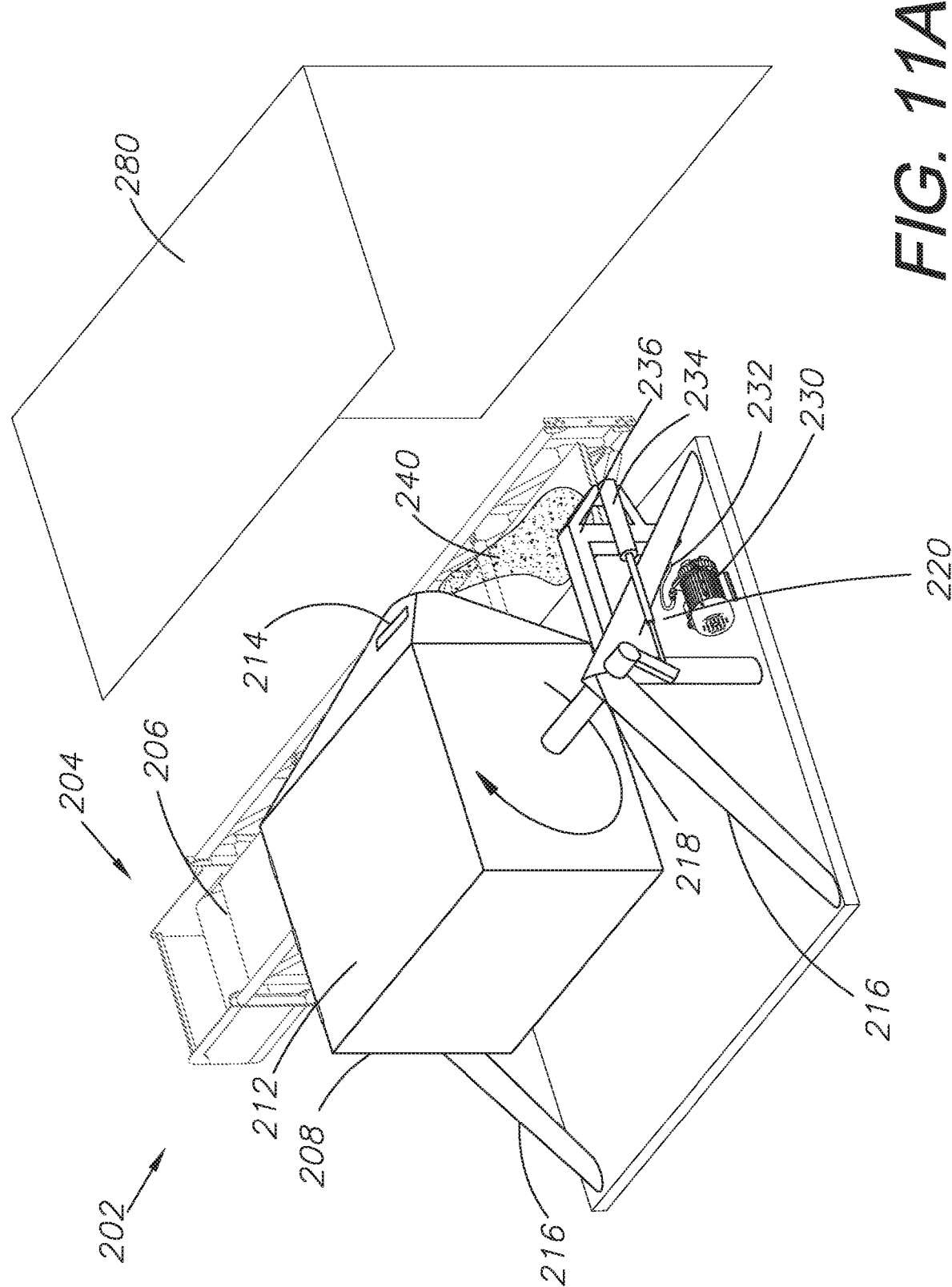
FIG. 11A is a three-dimensional isometric view thereof shown in an unloading orientation.

FIG. 11 shows a proppant container system 202 for loading proppant containers as described throughout this application. The system 202 has a conveyor assembly 204 including conveyor belt 206 for moving unloaded proppant 240 as shown in FIG. 11A. An enclosure 208 to hold container system 2 for unloading includes an interior space 210, and a door 212 for closing the interior space. A gate valve 214 opens the enclosure 208 spout 238 for emptying the container system 2 within the enclosure. A pivot frame 216 supports the enclosure and allows it to rotate about the pivot point 218. The gate valve 14 may be a Pratt® knife gate valve, provided by the Henry Pratt company of Aurora, Ill., or a similarly suited gate valve for opening and closing the spout 238.

A hydraulic piston and cylinder 234 mounted to a frame 236 can move a lever 220 to rotate the enclosure 208 about the pivot point 218. A hydraulic pump 230 connects to the frame 236 and cylinder 234 via a hose 232.

In another embodiment, multiple such enclosures 208 can be positioned along the belt 206 and on both sides of the belt such that multiple containers 6 can be emptied simultaneously.

A tent or enclosure 280 can cover the entire assembly to prevent weather from disturbing the unloaded proppant.

The conveyor 204 may be fully enclosed. A port could receive the proppant 240 from the enclosure 208 to move it into the enclosed conveyor. A rubber bumper seal would be used to seal the port, preventing dust and contaminants from contaminating the proppant.

VII. Alternative Embodiment Proppant Container System 302

Figure 12:
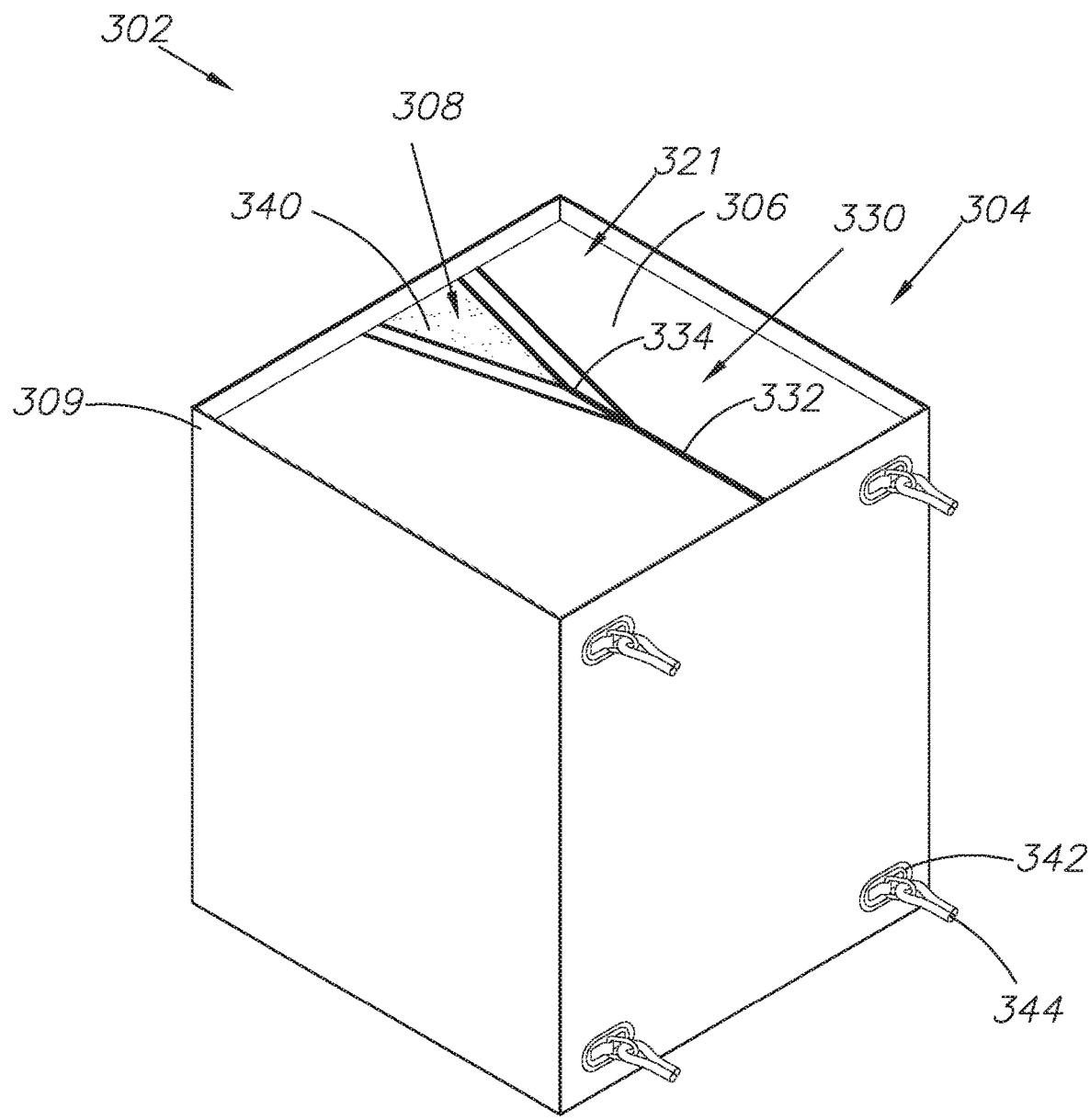
FIG. 12 is a three-dimensional isometric view of yet another embodiment of the present invention shown in a loading orientation.

FIG. 12 shows yet another alternative embodiment bulk material or proppant container system 302 where the container 306 includes a zip-top interface 330 for closing the container 306 once filled. There is an exterior zipper 332 and an interior zipper 334. In a preferred embodiment, he zippers 332, 334 are similar to that used for plastic storage bags, and prevents the elements from entering the container. The exterior greater holding-strength zipper prevents the contents from spilling out of the container 306 during transport, and is manually activated. When the top zipper 332 is opened and the container is tipped, however, the interior lesser holding-strength zipper 334 automatically will open due to the pressure of the bulk material or proppant 340 within the container, allowing the container to be emptied.

A frame 304 of structural walls 309 can be placed around the top portion of the container 306 to help when loading the container 306 via the container opening 308. The container is placed within the open space 321 between the structural walls 339. Hooks 334 affixed to latches 332 on the structural walls 309 can be used to then pull the walls away from the container 306 once filled. When filled, the container retains its shape.

Figure 13:
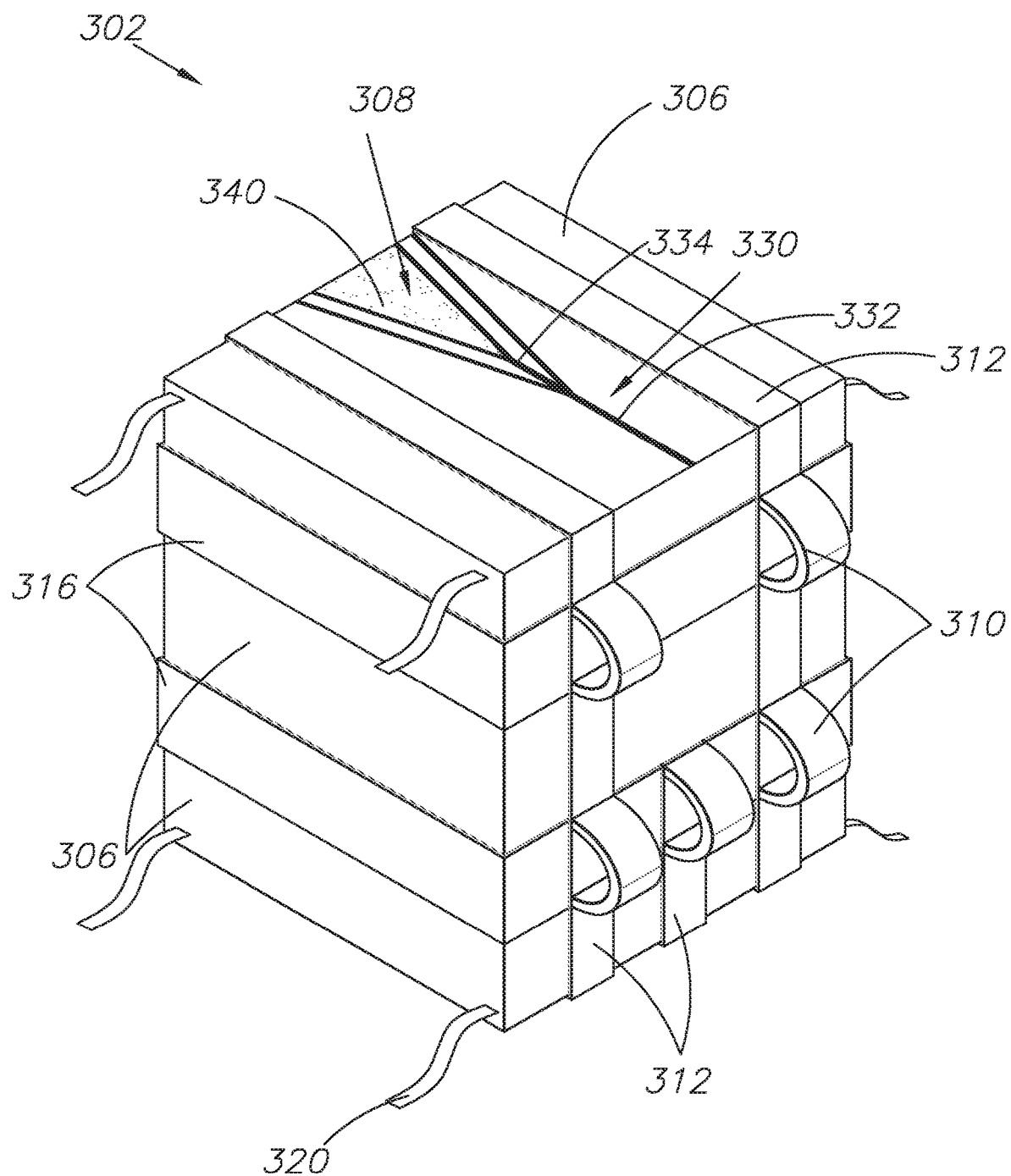
FIG. 13 is a three-dimensional isometric view thereof shown in an loaded orientation.

As shown in FIG. 13, the container 306 is secured by vertical lifting straps 312 and horizontal lifting straps 316. Several rows of lifting loops 310 separated by a distance of more than 20% of the container height allow the container to be lifted using a fork lift truck with 2 or 4 or more tines or other suitable method such that the weight of the container is supported on the weight bearing side of the container to avoid deformation or rupture. As with the previous embodiments, the container 306 can then be tilted until at an angle such that the zip-top interface 330 is forced open by the proppant 340 within the container 306, and the container is emptied.

Tie-down straps 340 for securing the container 306 during transport or unloading may be affixed to all corners.

VIII. Alternative Embodiment Proppant Container System 352

Figure 14:
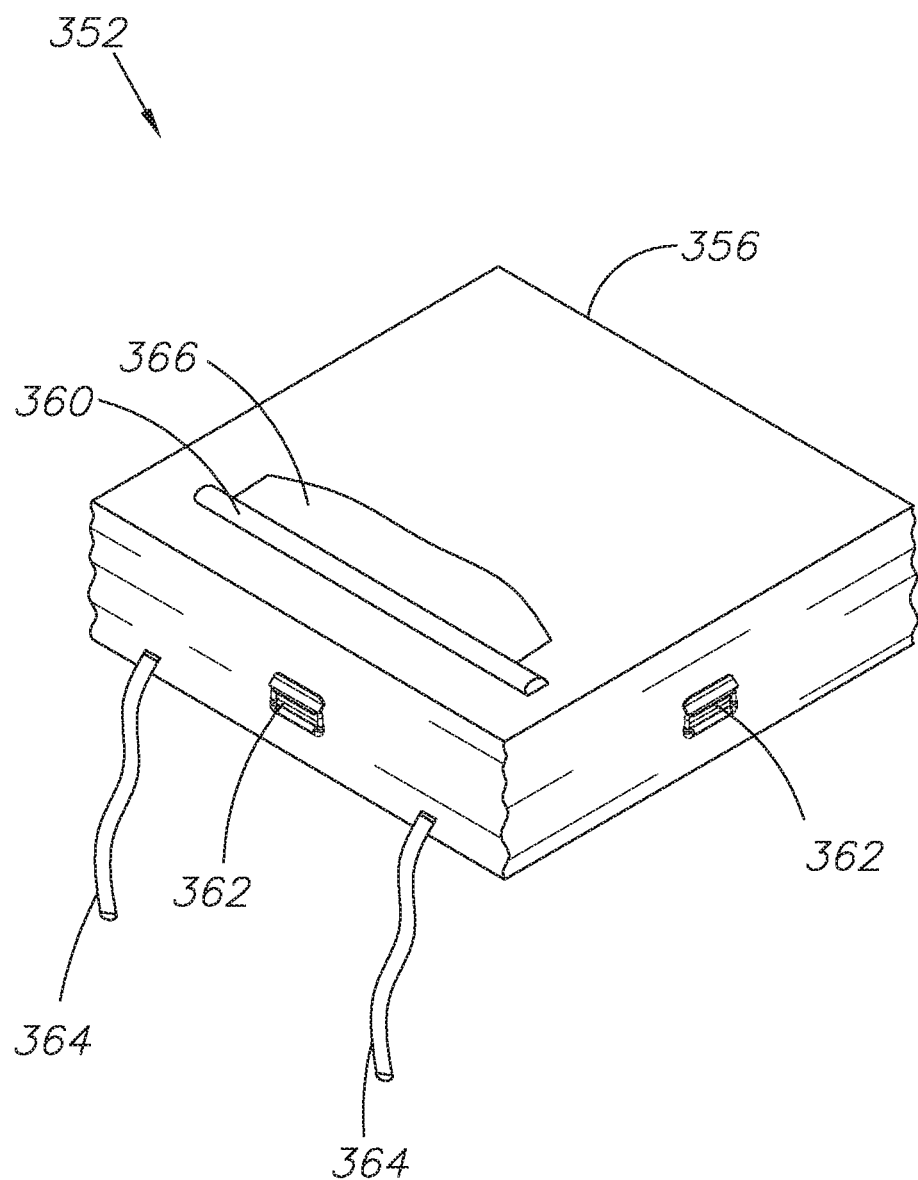
FIG. 14 is a three-dimensional isometric view of a slightly alternative embodiment of the present invention shown in a stored orientation.

FIG. 14 shows a separate container cover which is used to provide extra protection for the container when storing and also provides a means for packing and transporting the discharged container. In this embodiment, the proppant container system 352 where the container 356 has been emptied of proppant and has been compacted into a folded position. The interior of the container is visibly empty of proppant as would be viewable through its opening. Handles 362 on either side of the container 356 allow for easy carrying of the container. Straps 364 can be used to secure the container 356 into a compact orientation using buckles or other fastening elements. A pouch containing a plastic bag 366 for sealing and storing the used container into for transport for reuse may also be included.

IX. Alternative Embodiment Proppant Container System 402

Figure 15:
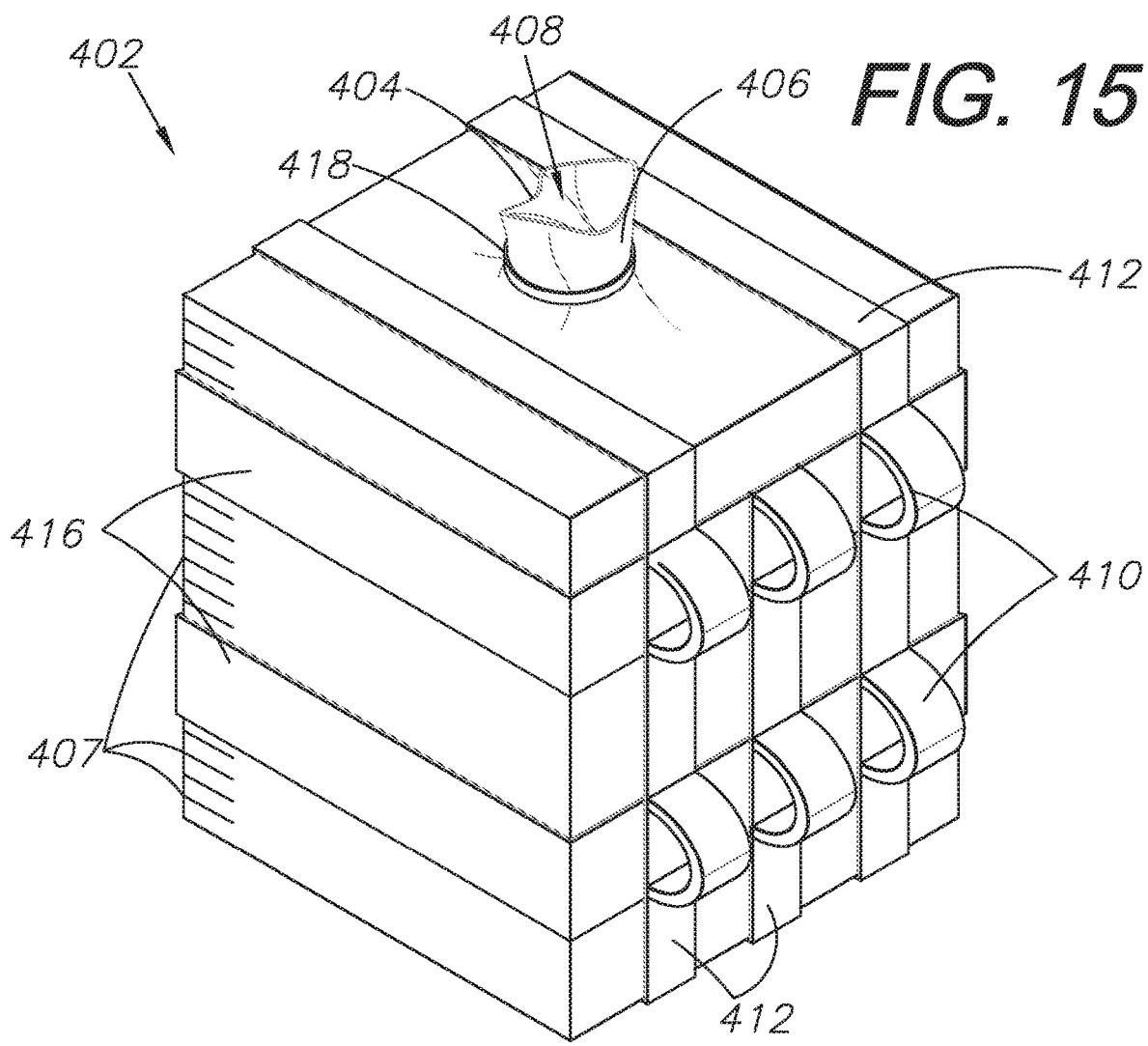
FIG. 15 is a three-dimensional isometric view of yet another alternative embodiment of the present invention.

Similar to the embodiment 302 above, FIG. 15 shows an alternative embodiment proppant container system 402 where the container 406 includes a spout 404 for filling and emptying the container. The spout may be an excess portion of the container 406 material itself which simply extends outwards and upwards from the container, or it may be a physical element which is placed around the opening 408 of the container. A spout clamp 418, which may be a tie, proprietary clamp, or other closure device, cinches the spout closed or otherwise seals the spout until the container system 402 is in position to be emptied.

The container may include markings 403 which indicate the weight of the container based on how full the container 406 is. The weight may be written or printed around these markings 403, or may be in a reference manual separate from the container system 402. The numbers could indicate by sand weight by volume (e.g. 2, 4, 6, 8, 10, 12, and 13) in thousands of pounds or kilos determined by the density of the material. Gravel would have different number scale because in has a different density. An FBIC could have multiple different scales printed on its sides for different material and designated as such materials.

The container 406 is secured by vertical lifting straps 412 and horizontal straps 416 or protective material. Two or more rows of lifting loops 410 separated by a distance of more than 20% of the container height allow the container to be lifted using a fork lift truck with 4 or more tines or other suitable method such that the weight of the container is supported on the sides of the lifting loops to avoid deformation or rupture when the container is rotated in the z axis for discharge from the top of the container. It is preferred that the lifting straps run under the container and over the top of the container. These lifting loops may be located on either the vertical 412 or horizontal 416 lifting straps.

Figure 15A:
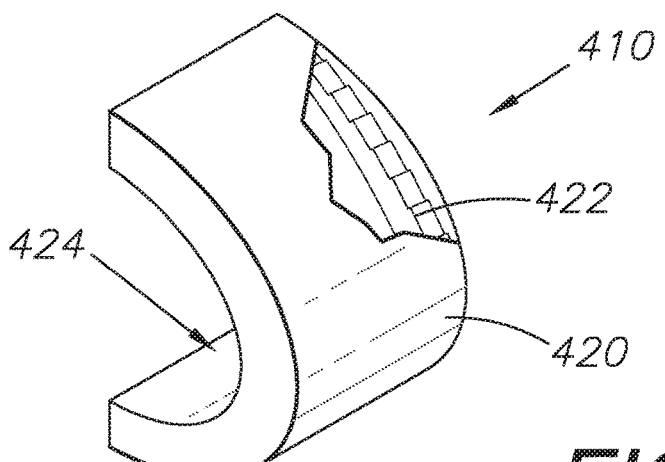
FIG. 15A is a detailed three-dimensional view of a lifting loop element thereof.

FIG. 15A shows a detailed view of one of the lifting loops 410 showing how it is a rigid lifting loop for receiving a fork lift fork or crane hook for lifting and turning the container system 402. The loops consist of a rigid external or internal structure 422, an outer layer 420 and an internal loop 424 for receiving the fork or hook. The internal structure 422 may be a spring-like material which forces the loop away from the container to keep it in an open orientation. The loop may optionally have an opening such as a buckle or a clasp to allow the user to selectively open and close the loop about an object.

Figure 16:
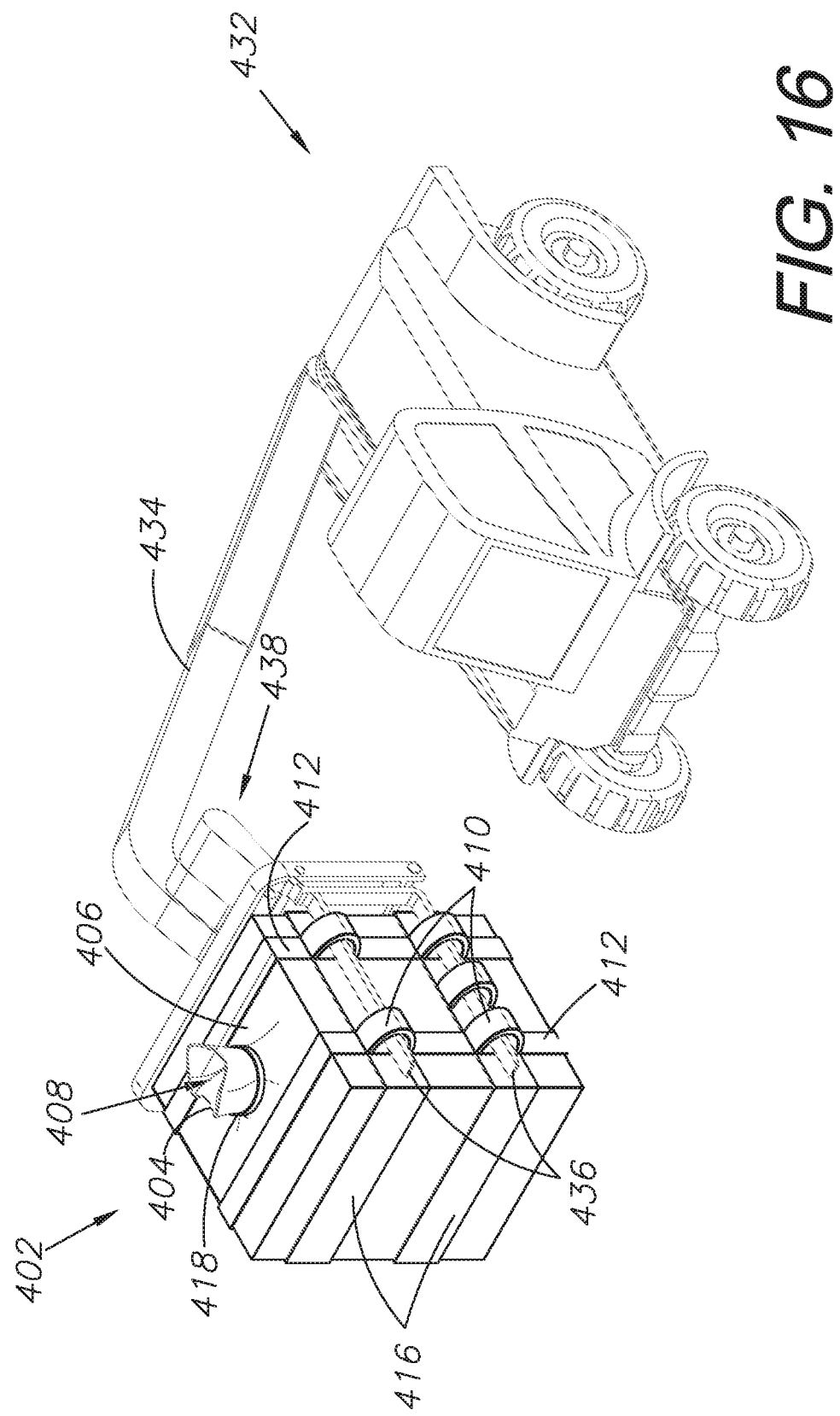
FIG. 16 is a three-dimensional isometric view thereof shown in a raised orientation with a fork truck.

FIG. 16 shows the proppant container system 402 used in an unloading configuration 432 where the system 402 is lifted by a fork truck 434 having a pivotable arm assembly 438. The container system 402 is lifted by inserting the fork 436 of the fork truck 434 through the pallet lifting loops 410.

Figure 17:
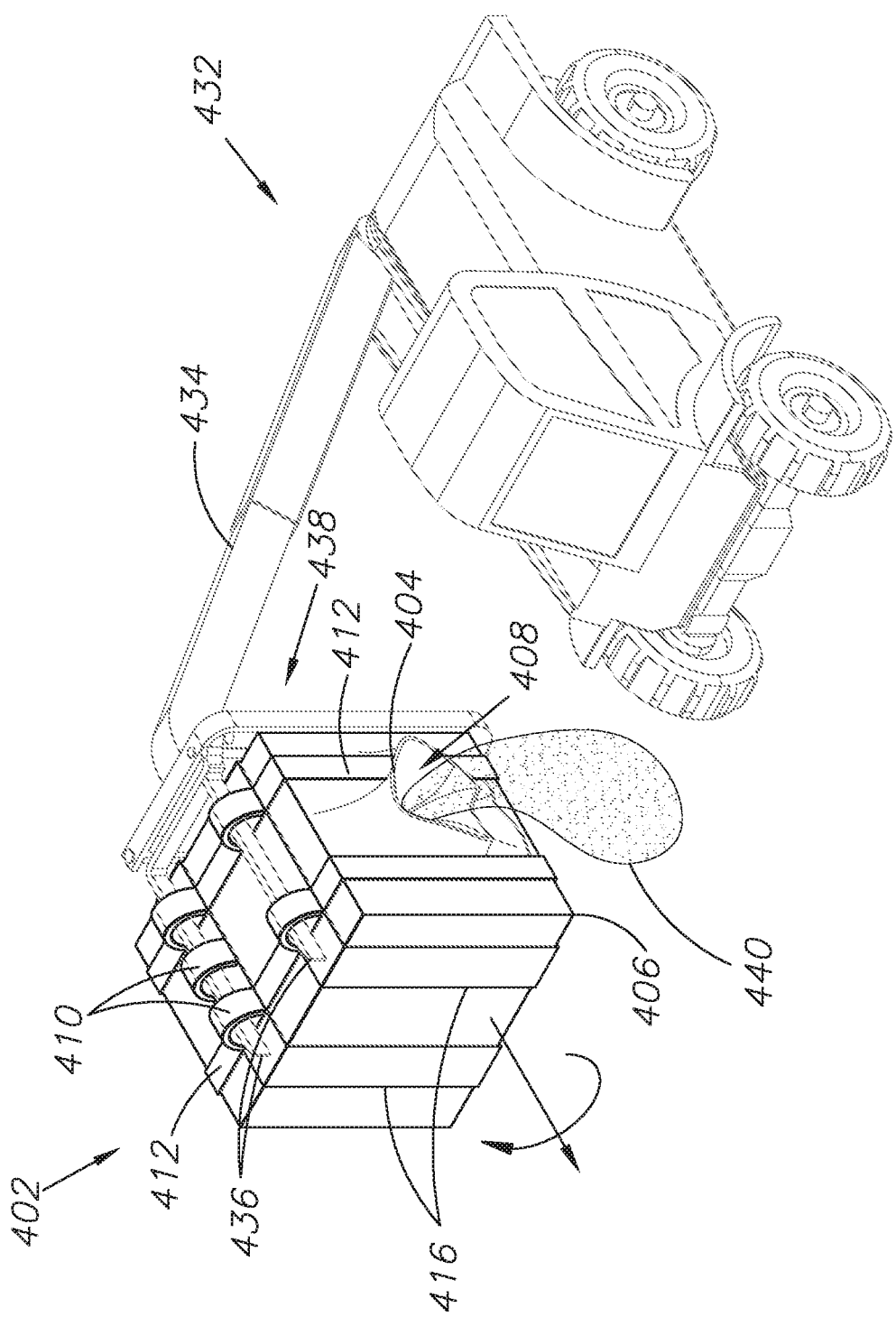
FIG. 17 is a three-dimensional isometric view thereof shown in an unloading orientation.

FIG. 17 shows how the entire container assembly 402 can be rotated about an axis by the pivotable arm assembly 438 to empty the proppant 440 from the funnel assembly 438. The assembly can tilt up to 180 degrees preferably.

X. Alternative Embodiment FIBC System 502

Figure 18:
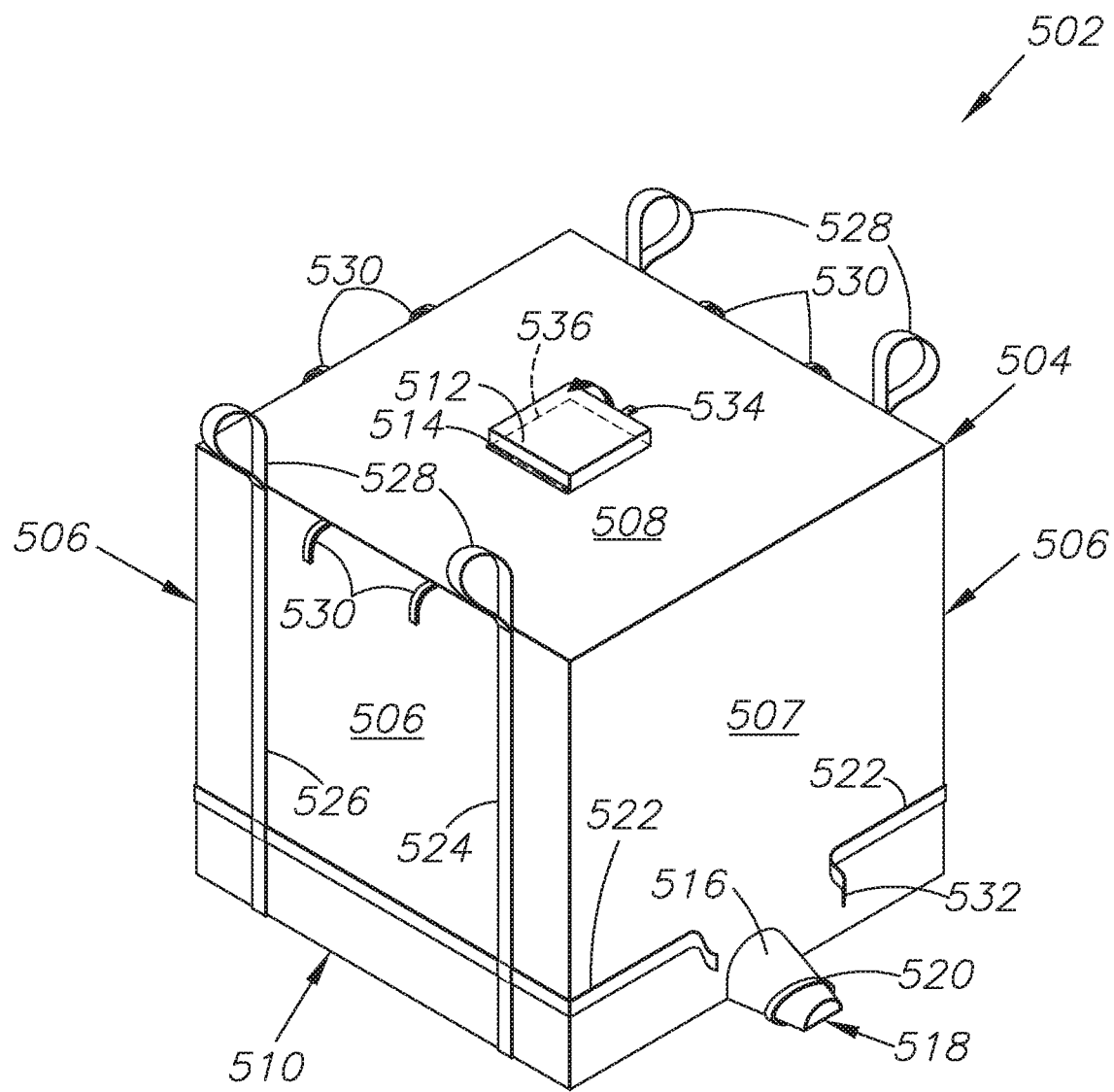
FIG. 18 is a three-dimensional isometric view of an alternative FIBC system with a chute in a deployed position.

FIG. 18 shows an alternative embodiment FIBC 504 storage and deployment system 502. The FIBC has a front wall 507 and three additional walls 506, a top 508, and a bottom 510. The top includes an opening 562 covered by a hatch 512. The hatch includes a hinge 514 and a locking cam 534 or other locking element to prevent the hatch from accidentally opening. The FIBC is filled through the hatch 512 using a loading funnel or any of the loading methods or systems described in the embodiments above. In a preferred embodiment a rubber seal 536 is placed around the hatch to prevent moisture from entering the FIBC.

A first 524 and second 526 lifting strap is shown deployed around the FIBC, looped below the bottom 510 of the FIBC, and up another side 506. Each end of these lifting straps ends in a lifting loop 528 which can be used to lift, move, load, and unload the FIBC using fork trucks or by other methods. Hooks 530 may also be affixed to the sides 506 of the FIBC and used for loading, unloading, moving, lifting, and securing the FIBC during any phase of the loading and unloading process.

Figure 19:
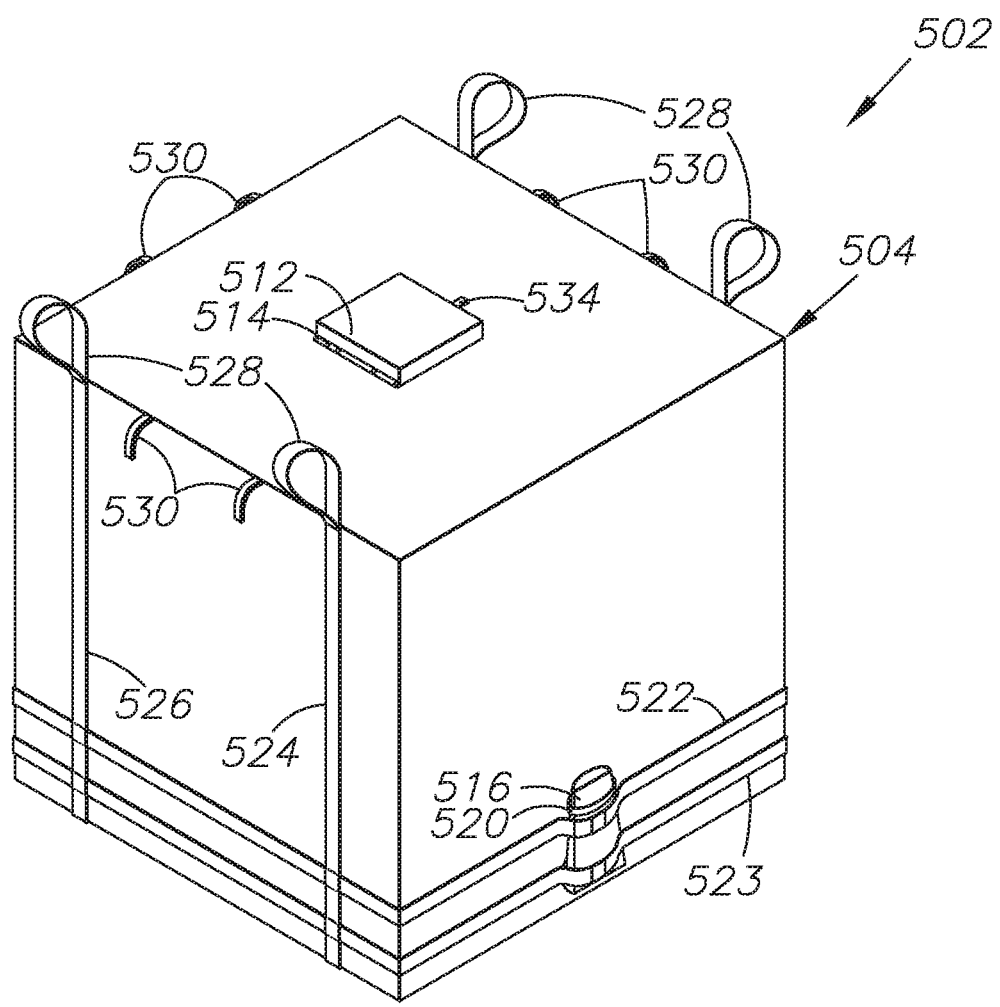
FIG. 19 is another three-dimensional isometric view thereof with the chute in a stored position.

A security strap 522 wraps around the FIBC and can be used to secure the spout 516 against the front face 507 of the FIBC 504 as shown in FIG. 19. A second such strap 523 can be used lower than the first security strap 522 to help prevent the spout from being pushed outward by the material stored within the FIBC. Each of these straps 522, 523 includes a buckle 532 or other fastening device to allow the straps to be disconnected to allow the spout 516 to drop down into an unloading orientation. A clamp 520 can also be placed on the spout 516 near the spout tip 518 to prevent premature release of the material through the spout.

Figure 20:
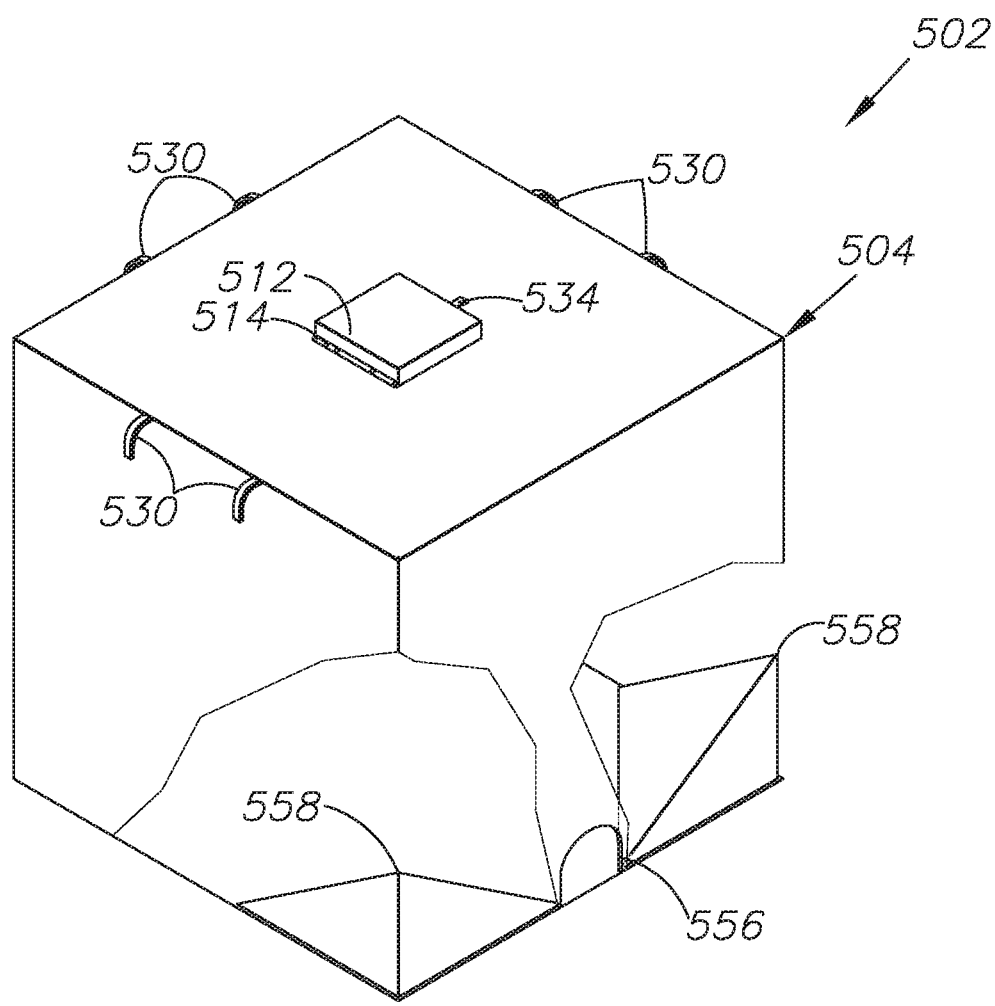
FIG. 20 is a partially cut-away three-dimensional isometric view thereof showing internal elements.

FIG. 20 shows the FIBC 504 partially cut away to show a pair of rigid deflectors 558 which help to guide material within the FIBC toward the front opening 556 which leads to the spout 516. These deflectors could be made of plastic or other rigid materials and may be permanently or temporarily placed within the FIBC.

Figure 21:
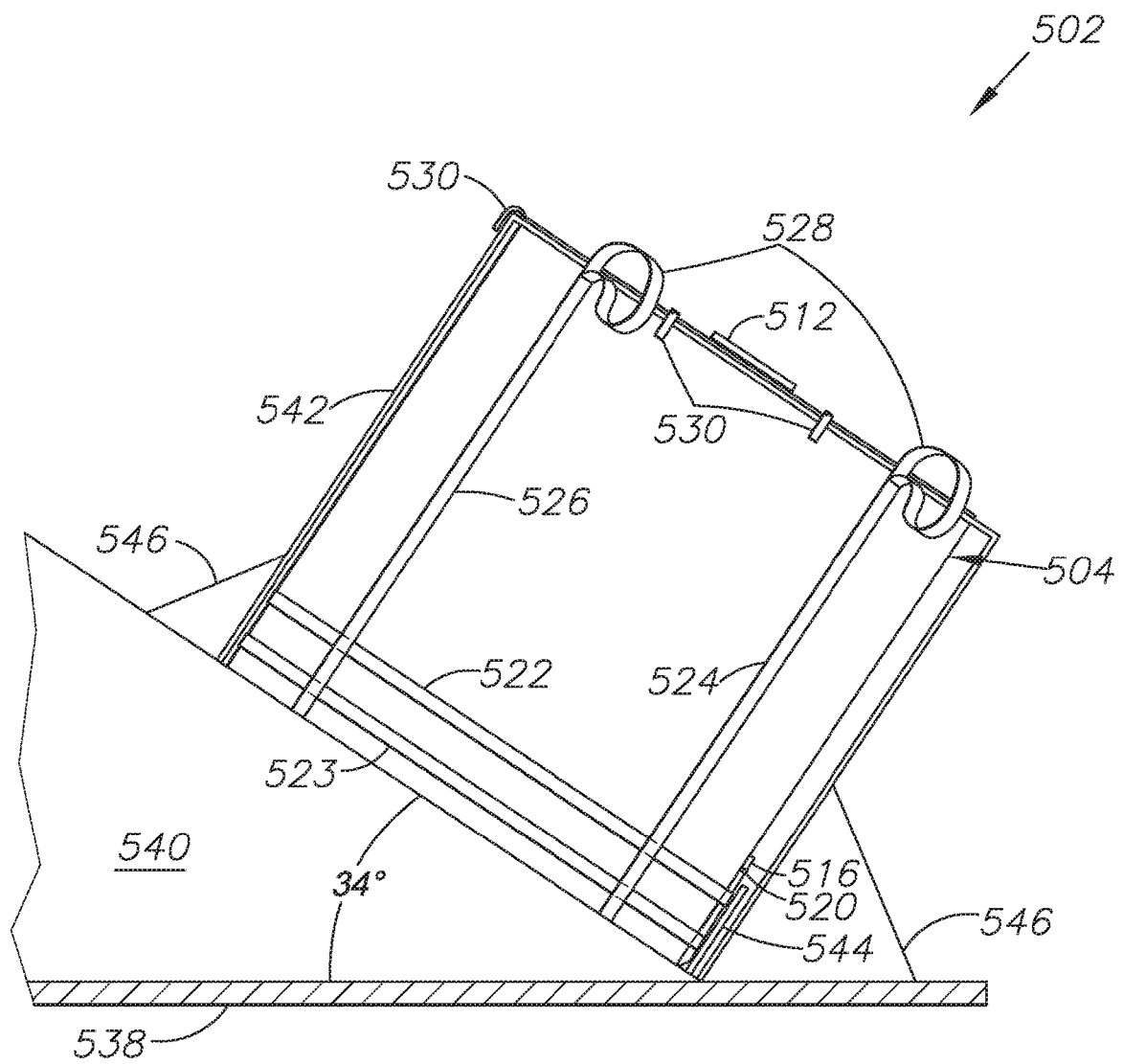
FIG. 21 is a side elevational view thereof shown in a stored orientation on a truck bed with a ramp.

FIG. 21 is a side elevational view of the FIBC system 502 loaded onto an incline ramp 540 placed onto a truck bed 538 for transporting and unloading the FIBC 504. Instead of the ramp 540, the FIBC can simply be tilted using any suitable mechanism to approximately 34 degrees which is the angle of repose for sand which is a typical material to be stored within the FIBC 504. This allows the material to be unloaded from the FIBC using gravity.

A trailer support jig 542 secures the FBIC to the trailer bed 538 and/or incline ramp 540. The jig 542 can be secured to the FBIC using the hooks 530 or through other means. Support braces 546 secure the jig 542 to the trailer bed 538 and/or the incline ramp 540. A restrictor plate 544 secured to the jig 542 restricts the FIBC 504 from sliding down the incline ramp 540.

Figure 22:
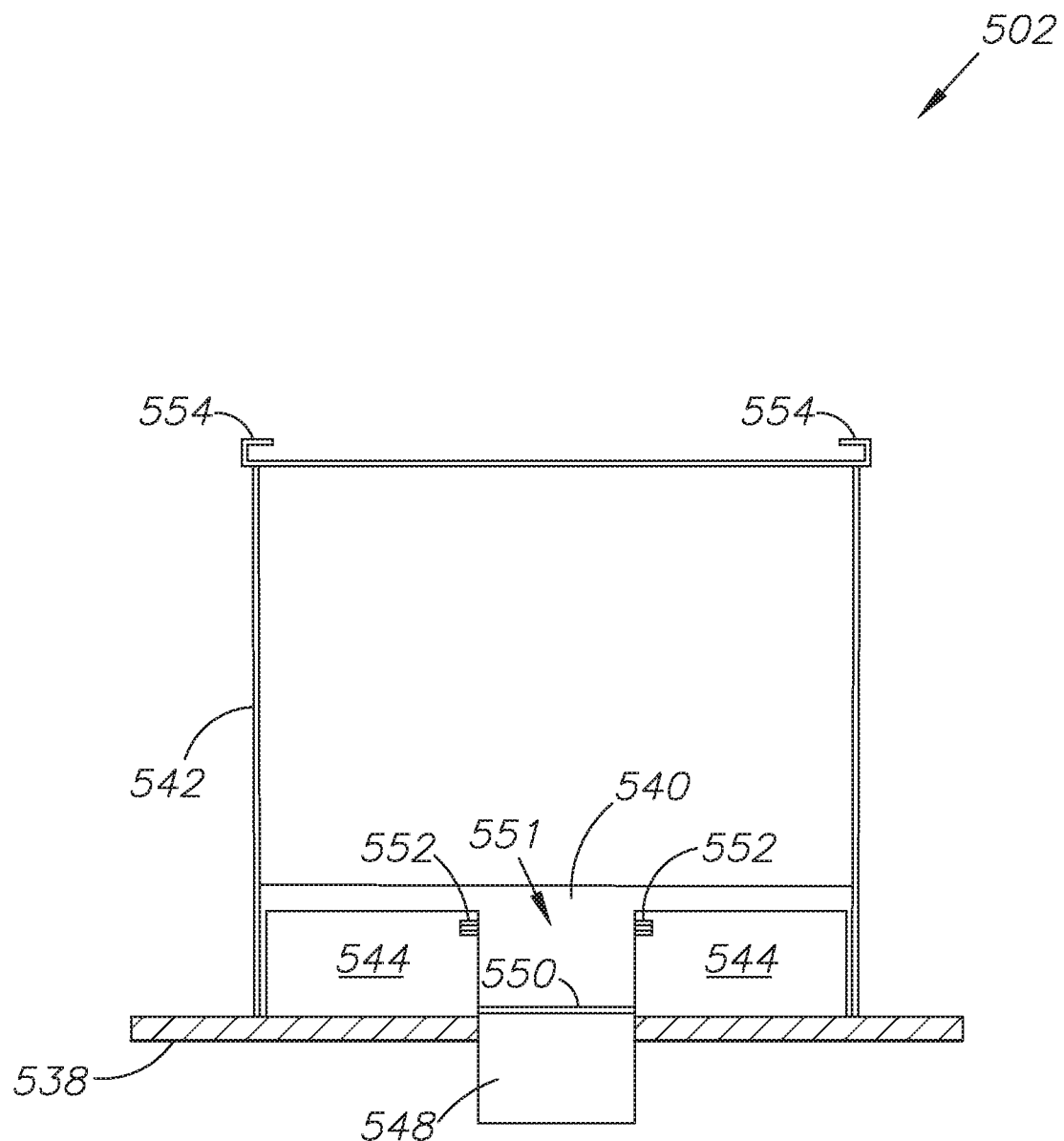
FIG. 22 is a front elevational view of the truck bed with ramp without the FIBC.
Figure 22A:
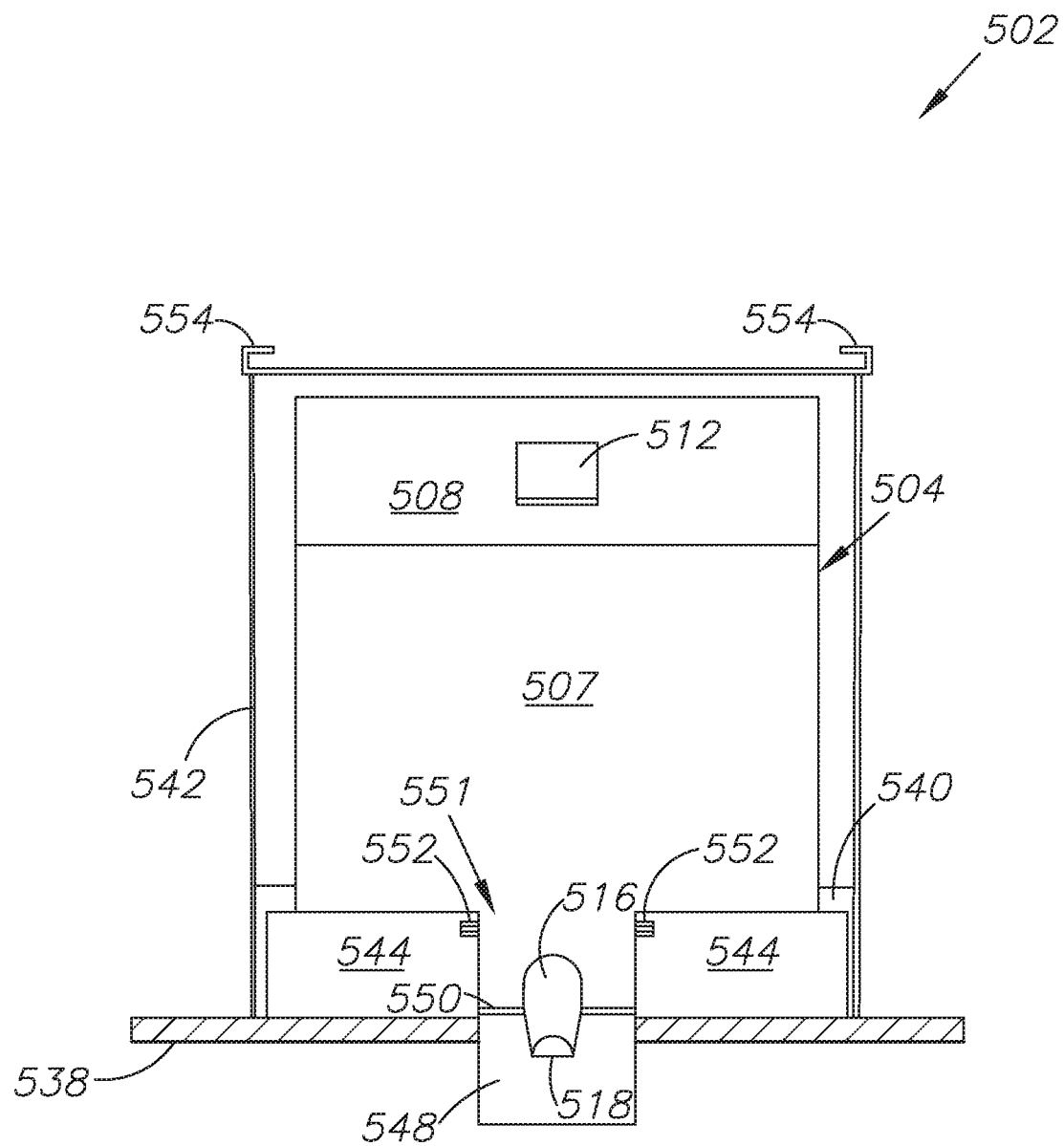
FIG. 22A is a front elevational view thereof with the FIBC stored within.

FIG. 22 is a front elevational view of the trailer bed 538 and incline ramp 540 showing the jig 542. A pair of notch sliding receptors 554 are above the jig 542. These notch sliding receptors can receive the lifting loops 528 to secure the FIBC 504 in place when filling the container. The restrictor plate 544 is shown having a door 548 hingedly connected to the restrictor plate 544 with a hinge 550. Locking elements 552 can be used to secure the door 548 up until released to allow the FIBC 504 to be unloaded as shown in FIG. 22A. These locking elements 552 could be manual, hydraulic, or electronically controlled pins or other known locking elements. When the door 548 is in a lowered orientation as shown in FIG. 22, it provides an opening 551 within the restrictor plate 544.

FIG. 22A shows the FIBC 504 stored on the trailer bed 538 and the spout 516 oriented through the opening 551 of the restrictor plate 544 provided by the door 548.

Figure 23:
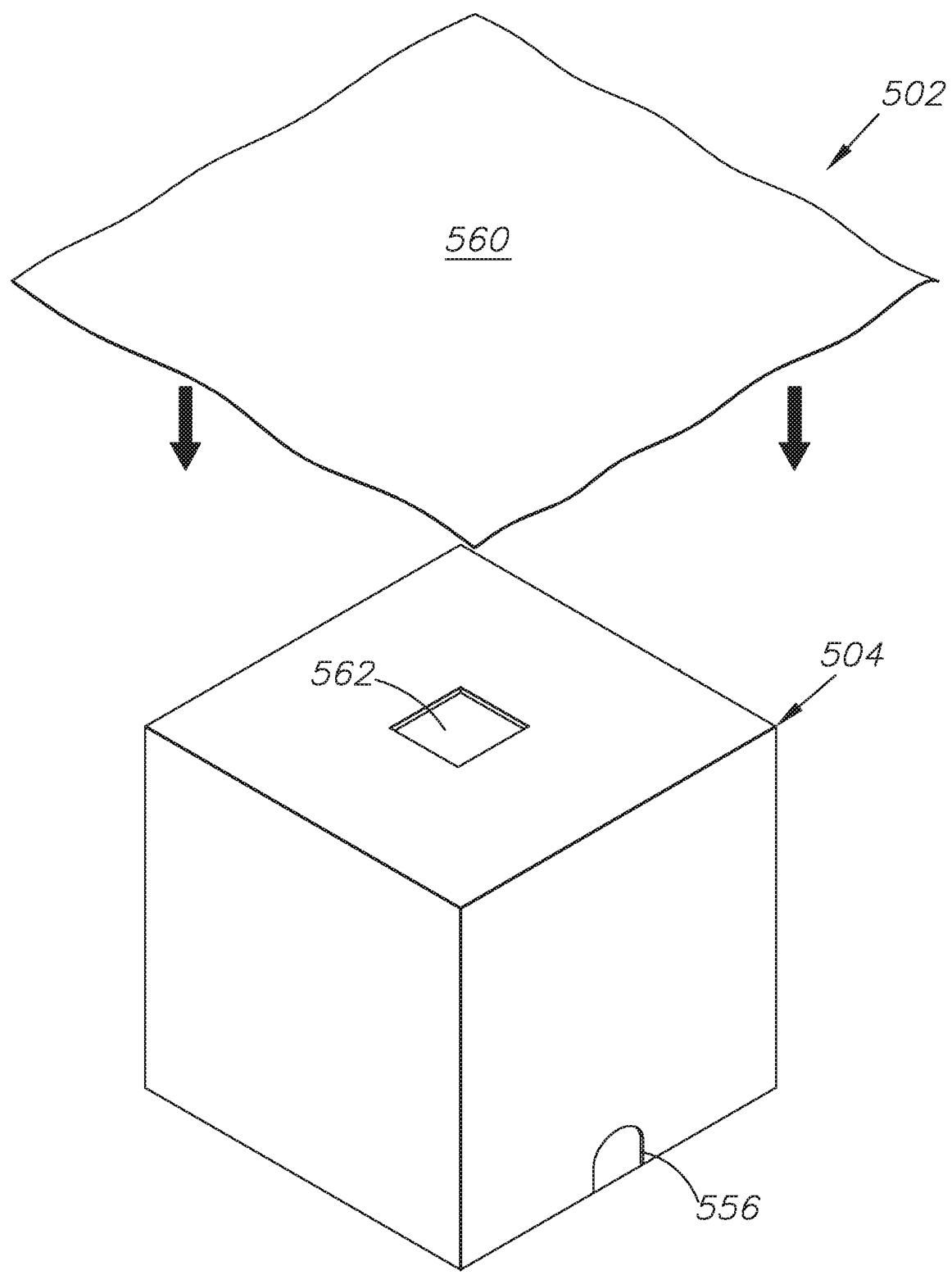
FIG. 23 is a three-dimensional isometric view thereof showing an additional application to the FIBC.
Figure 24:
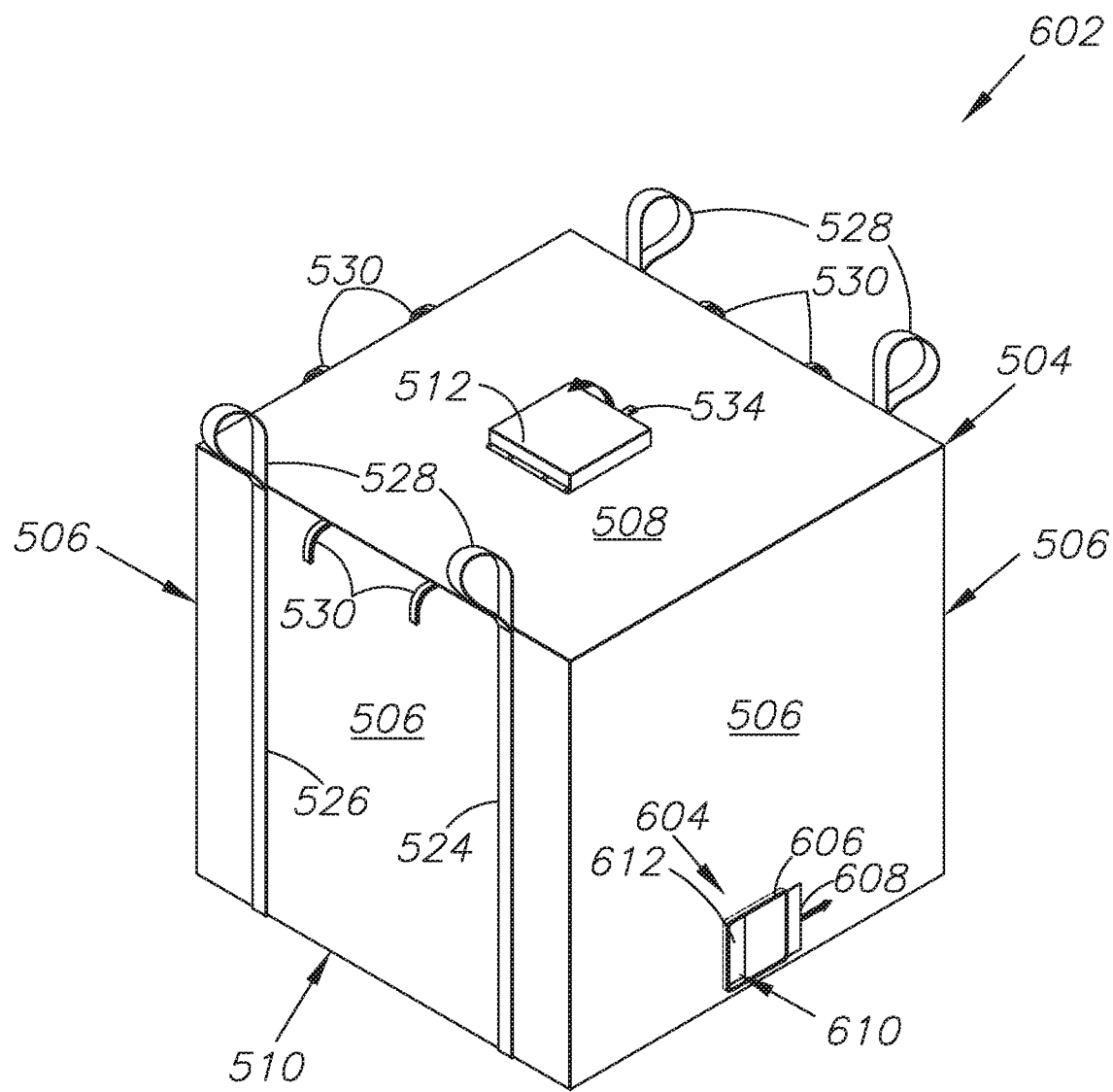
FIG. 24 is a three-dimensional isometric view of a slightly alternative embodiment thereof.
Figure 25:
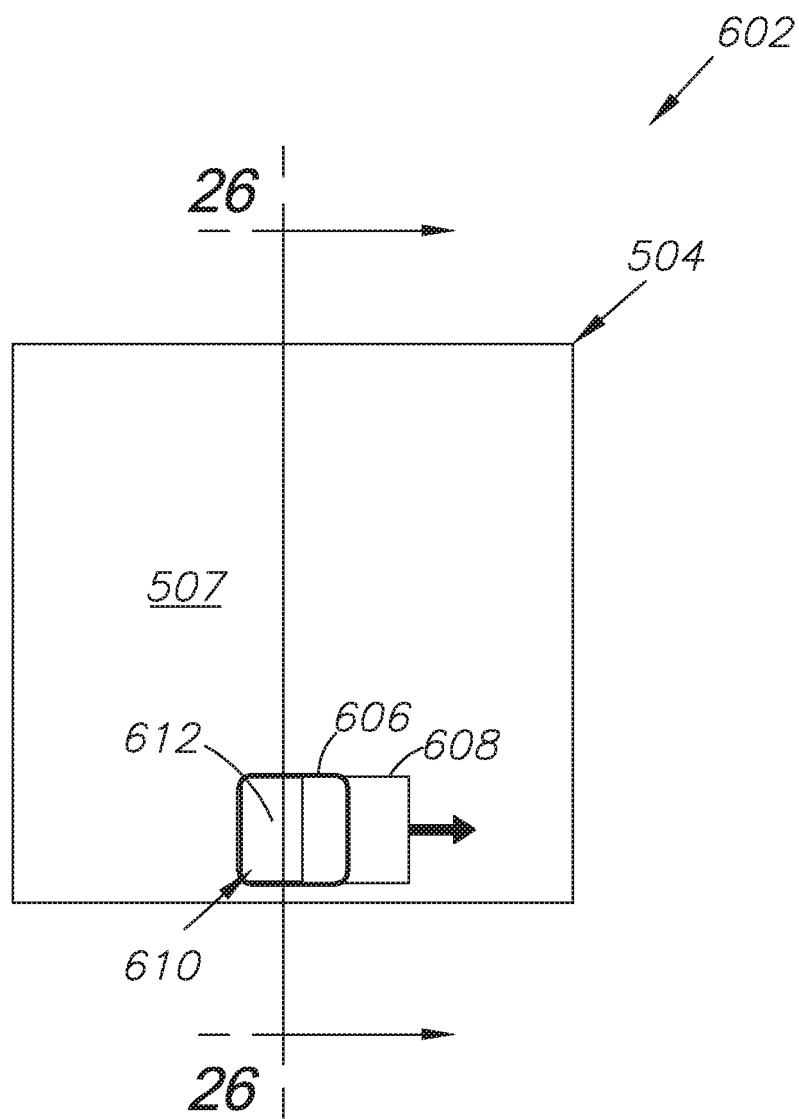
FIG. 25 is a front elevational view thereof.
Figure 26:
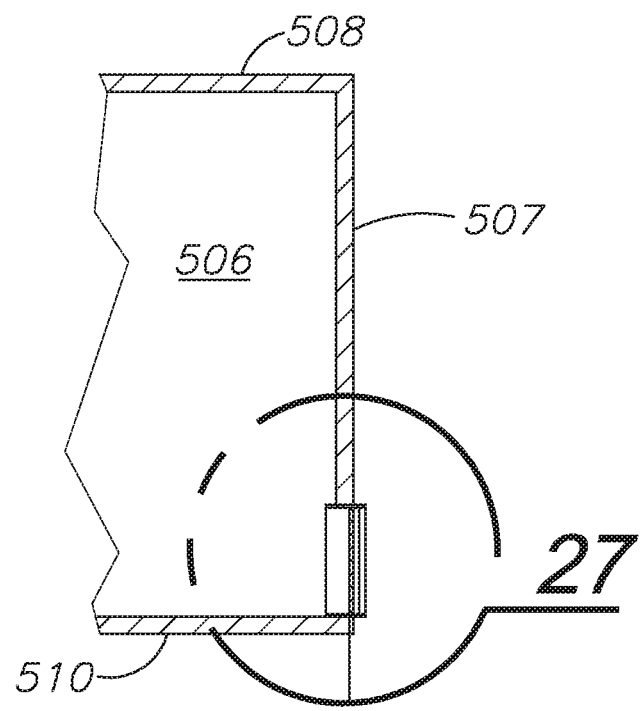
FIG. 26 is a side sectional view taken about the line of FIG. 25.
Figure 27:
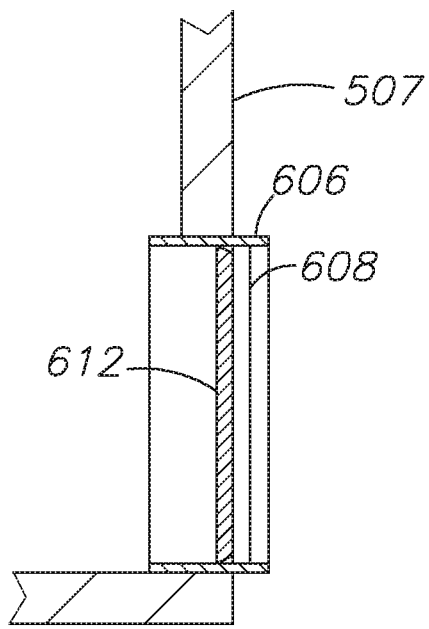
FIG. 27 is a detailed side sectional view taken about the circle of FIG. 26.

FIG. 23 shows the FIBC 504 having an additional cover application 560 applied to it. The cover application 560 is a layer of ultra-violet (UV) resistant high-density polyethylene (HDPE) material, such as a fabric, film, or spray, which is placed on the exterior of the FIBC prior to assembly of the container. While some existing FIBC containers include some UV resistance in their outer shells, these containers may sit for long periods of time, up to years. The outer layer of the cover application 560 will prevent the interior FIBC 504 from degrading under UV rays, while the interior FIBC 504 has the strength to hold the bulk material.

XI. Alternative Embodiment FIBC System 602

FIGS. 24-27 shows an alternative embodiment FIBC loading and unloading system 602 which is identical to the previous embodiment 502 and uses the same FIBC 504. An alternative unloading option 604 is provided. This includes a hatch frame 606 with a sliding gate 608 which leads to an opening 610 into the FIBC 504. A cover 612 within the hatch frame 606 is removed for unloading. The user would then connect a discharge hose, funnel, or other unloading apparatus (not shown) to the hatch frame 606, and the sliding gate 608 is slid to access the opening 610, thereby unloading the material within the FIBC as described above using gravity. The cover 612 is shown to be convex to prevent the sliding gate 608 from being pressed against and potentially damaged by the material within the FIBC 504.

XII. Alternative Embodiment FIBC System 702

Figure 28:
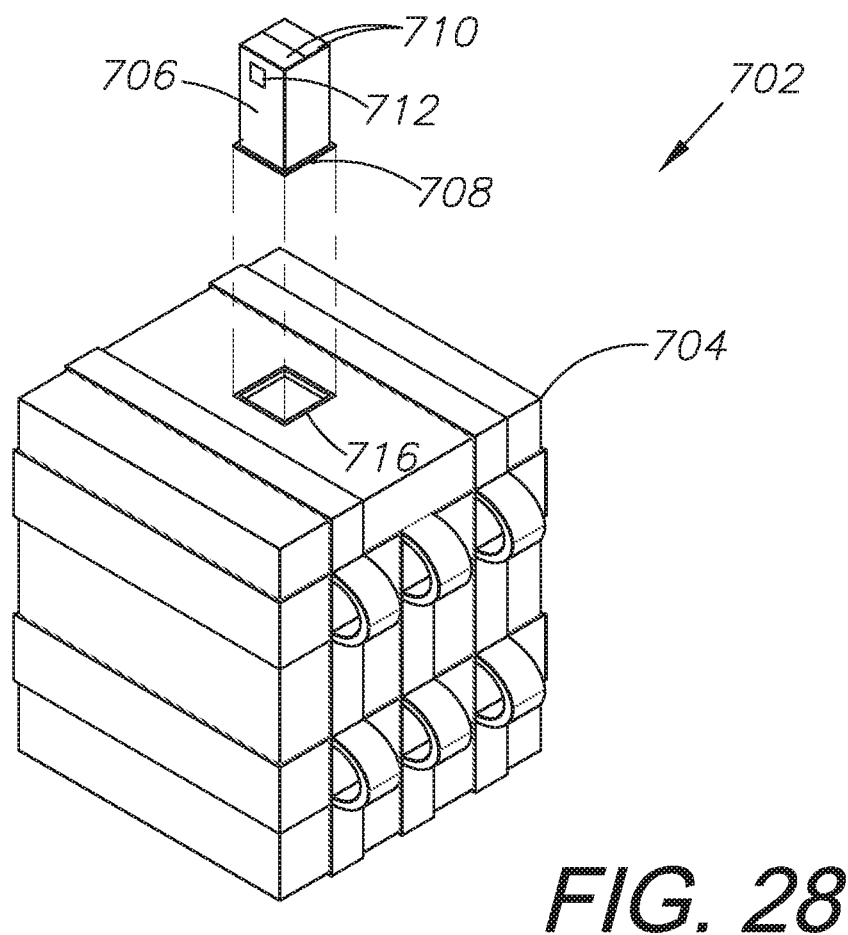
FIG. 28 is a partially-exploded three-dimensional isometric view of an alternative embodiment FIBC system.
Figure 29:
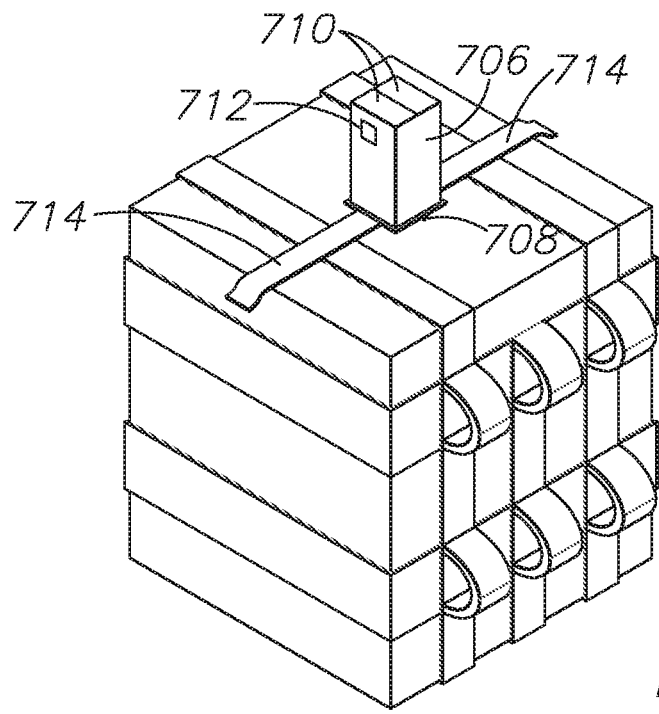
FIG. 29 is a three-dimensional isometric view thereof shown in an assembled orientation.

FIG. 28 shows an FIBC 704 with a top opening hatch 716. An attachment assembly 706 can be clamped to the hatch 716 with clamps 708 or locks and further secured using strengthening straps 714 when under heavy load. The attachment assembly 706 includes doors 710 which are remotely controlled using a remote controlled actuator 712. The remote control may be wireless or wired. The FIBC can be turned and emptied of bulk material through the top opening hatch 716 and through the attachment assembly 706.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A bulk material containment system comprising:
    a flexible intermediate bulk container (FIBC) comprised of a high strength, flexible fabric configured for storing bulk material, said FIBC including a front wall, a rear wall, a top wall, a bottom wall, and two side walls;
    said FIBC comprising a top opening configured for receiving said bulk material;
    said FIBC being further configured to be lifted and tipped for deploying said bulk material at a selected location;
    a front opening located on said front wall, said opening configured for unloading said bulk material through a spout affixed to said front wall;
    a hatch hingedly affixed to said top wall of said FIBC about said top opening;
    a moisture-proof seal about said hatch;
    a clamp configured for releasably sealing said spout; and
    a first horizontally-oriented strap wrapped about said FIBC and configured for releasbly confining said spout in a non-deployed orientation.

2. The bulk material containment system of claim 1, further comprising:
    said horizontally-oriented strap comprising a buckle configured to release said spout from said non-deployed orientation; and
    whereby said spout is placed in a deployed position.

3. The bulk material containment system of claim 1, further comprising a locking element configured to releasably lock said hatch about said top opening.

4. The bulk material containment system of claim 1, further comprising a second horizontally-oriented strap wrapped about said FIBC and configured for releasbly confining said spout in a non-deployed orientation.

5. The bulk material containment system of claim 1, wherein said FIBC is rotated such that said FIBC is at an angle between 10 degrees and 34 degrees, wherein said bulk material is configured to be discharged through said front opening via gravity.

* * * * *